United States Patent
Ma et al.

(10) Patent No.: US 8,280,876 B2
(45) Date of Patent: Oct. 2, 2012

(54) SYSTEM, METHOD, AND PROGRAM PRODUCT FOR DATABASE RESTRUCTURING SUPPORT

(75) Inventors: Qiang Ma, Tokyo (JP); Yoshihide Ishiguro, Tokyo (JP)

(73) Assignee: NEC Corporation, Tokyo (JP)

( * ) Notice: Subject to any disclaimer, the term of this patent is extended or adjusted under 35 U.S.C. 154(b) by 514 days.

(21) Appl. No.: 12/599,606

(22) PCT Filed: Apr. 30, 2008

(86) PCT No.: PCT/JP2008/058273
§ 371 (c)(1),
(2), (4) Date: Nov. 10, 2009

(87) PCT Pub. No.: WO2008/139936
PCT Pub. Date: Nov. 20, 2008

(65) Prior Publication Data
US 2010/0217759 A1    Aug. 26, 2010

(30) Foreign Application Priority Data
May 11, 2007 (JP) .................................. 2007-127261

(51) Int. Cl.
*G06F 7/00* (2006.01)
*G06F 17/30* (2006.01)
(52) U.S. Cl. .......................... 707/719; 707/687; 707/713
(58) Field of Classification Search .................. 707/713, 707/719
See application file for complete search history.

(56) References Cited

U.S. PATENT DOCUMENTS

| | | | |
|---|---|---|---|
| 6,546,381 B1 | 4/2003 | Subramanian et al. | |
| 6,718,320 B1 * | 4/2004 | Subramanian et al. | 707/719 |
| 7,007,006 B2 | 2/2006 | Zilio et al. | |
| 7,260,563 B1 * | 8/2007 | Priyadarshi et al. | 707/714 |
| 7,272,589 B1 * | 9/2007 | Guay et al. | 707/716 |
| 8,140,516 B2 * | 3/2012 | Bhattacharjee et al. | 707/713 |

(Continued)

FOREIGN PATENT DOCUMENTS

JP          1-102656 A          4/1989

(Continued)

OTHER PUBLICATIONS

Hector Garcia-Molina et al., "Database Systems: The Complete Book," 2002, pp. 787-835, Prentice Hall.

(Continued)

*Primary Examiner* — Robert Timblin
*Assistant Examiner* — Jessica N Le
(74) *Attorney, Agent, or Firm* — Foley & Lardner LLP

(57) ABSTRACT

A database restructuring support system that enables a user to flexibly design the structure of a database after a restructure. A storage cost estimate unit 112 calculates storage cost before and after restructure by using catalog information included in a database 122. In the case of calculating the storage cost of the restructure, tuples of a new schema is calculated and the storage cost is calculated by using the tuples. The access cost estimate unit 113 uses the catalog information and the log DB 121 included in the database 122 to calculate each access cost before and after restructure. In the case of calculating the access cost after restructure, the number of types of values of an attribute in the new schema is calculated to calculate the access cost by using the number of types. The integrated cost estimate unit 111 calculates the integrated cost by integrating the access cost and the storage cost.

10 Claims, 17 Drawing Sheets

U.S. PATENT DOCUMENTS

| | | |
|---|---|---|
| 2005/0198013 A1 | 9/2005 | Cunningham et al. |
| 2005/0198019 A1 | 9/2005 | Cunningham et al. |
| 2006/0053140 A1* | 3/2006 | Wen et al. .................... 707/101 |
| 2006/0106759 A1 | 5/2006 | Nemoto et al. |
| 2008/0033989 A1* | 2/2008 | Cha et al. .................. 707/103 R |

FOREIGN PATENT DOCUMENTS

| | | |
|---|---|---|
| JP | 2006-127418 A | 5/2006 |

OTHER PUBLICATIONS

C. J. Date, "Database System Gairon" (An Introduction to Database Systems), 1997, $6^{th}$ edn., pp. 547-571, Maruzen Co., Ltd.

C. J. Date, An Introduction to Database Systems, 1995, $6^{th}$ edn., pp. 501-542.

* cited by examiner

Fig. 3

DATABASE SCHEMA STRUCTURE : $\{r_1, r_2, r_3, r_4\}$

ACCESS LOG : $\{q_1, q_2, q_3\}$
    $q_1$: select * from $r_1, r_2$ where $r_1.id = r_2.id$
    $q_2$: select * from $r_1, r_4$ where $r_1.id > r_4.id$
    $q_3$: select id, name from $r_3$ where id <100

CORRESPONDENCE INFORMATION OF ACCESS LOG AND SCHEMA
    SCHEMA ACCESSED BY $q_1$ : $r_1, r_2$
    SCHEMA ACCESSED BY $q_2$ : $r_2, r_4$
    SCHEMA ACCESSED BY $q_3$ : $r_3$

Fig. 4

|  | Item | Description |
|---|---|---|
| Table r | T(r) | No. of tuples of r |
|  | h | Tuple header size |
|  | r.A | Attribute set A of r |
|  | size($a_i$) | Size of attribute $a_i$ |
|  | V(r, $a_i$) | Variation of attribute $a_i$ value |
| File system | b | Block size |
|  | bh | Block header size |

NEW SCHEMA

| ID | name | department | age | address |
|---|---|---|---|---|
| 1 | Nichiden Taro | HQ | 30 | Tokyo |
| 2 | Nichiden Jiro | Tamagawa | 40 | Kanagawa |
| ... | ... | ... | ... | ... |
| 10000 | Kansai Jiro | Kansai | 50 | Osaka | s(ID, name, department, age, address)

```
select r1.ID, r1.name, r1.department,
       r2.age, r2.address
from   r1 full outer join r2
       on r1.ID = r2.ID
```

71 DEFINITION STATEMENT

EXISTING SCHEMA

| ID | name | department |
|---|---|---|
| 1 | Nichiden Taro | HQ |
| 2 | Nichiden Jiro | Tamagawa |
| ... | ... | ... |
| 10000 | Kansai Jiro | Kansai | r1(ID, name, department)

| ID | Name | Age | Address |
|---|---|---|---|
| 1 | Nichiden Taro | 30 | Tokyo |
| 2 | Nichiden Jiro | 40 | Kanagawa |
| ... | ... | ... | ... |
| 10000 | Kansai Jiro | 50 | Osaka | r1(ID, name, age, address)

Fig. 6

SIGN REPRESENTING A JOIN

```
select r₁.ID, r₂.name, r₂.department
from  r₁, r₂
  where r₁.ID=r₂.ID
```

SYSTEM, METHOD, AND PROGRAM PRODUCT FOR DATABASE RESTRUCTURING SUPPORT

TECHNICAL FIELD

The present invention relates to a database restructuring support system, a database restructuring support method, and a database restructuring support program product that support to design database optimization, and particularly to a database restructuring support system, a database restructuring support method, and a database restructuring support program product that support to design database restructure.

BACKGROUND ART

The technique of a related art to optimize a database is disclosed in non-patent document 1 (Hector Garcia-Molina, Jeffrey D. Ullman, and Jennifer Widom, "Database Systems: the Complete Book", the U.S., Prentice Hall, 2002, pp. 787-835.) and non-patent document 2 (C. J. Date, Japanese translation supervised by Y. Fujiwara, "Database System Gairon" (An Introduction to Database Systems), 6th edn., Maruzen Co., Ltd., 1997, pp. 547-571.) in detail. There are various methods for database optimization technique, such as database restructure, query optimization, index optimization, and optimization of data arrangement.

Restructuring a database is to change the organization of data stored in the database in order to improve the efficiency of data accesses and data storage. The organization of data stored in the database is a data schema, schema type, and the number of schemata. Therefore, the database structure (organization of data) can be expressed by a schema set. In this document, a database indicates a relational database. Further, the schema is defined as an attribute set or a pair of an attribute set and a condition set. The definition of the schema can be represented by the following formula 1, where the schema, the attribute set, and the condition set are respectively referred to as S, A, and C, and a pair of the attribute set A and the condition set C is referred to as (A, C). Note that, "|" indicates "or".

$$S := A | (A, C) \quad \text{(Formula 1)}$$

Moreover, the attribute set A and the condition set C are represented by the following formulas 2 and 3 respectively.

$$A := \text{attribute} + \quad \text{(Formula 2)}$$

$$C := (LOP + (\text{attribute} COP (\text{attribute} | \text{value}))) + \quad \text{(Formula 3)}$$

Note that "attribute" indicates an attribute and "value" indicates an attribute value. The sign "+" indicates that the contents on the left side of the sign appear 0 or more times. Further, COP indicates a comparative operator and LOP indicates a logical operator. As kinds of the comparative operators COP, there are ">", "<", "=", "<=", ">=", and "≠". Moreover, as the logical operators, there are "and (AND)", "or (OR)", and "not (NOT)".

The formula 2 indicates that the attribute set A is defined as a set composed of 0 or more attributes. Further, the formula 3 indicates that the condition set C is defined as a set of 0 or more conditional expressions including LOP (logical operator), an attribute (attribute), COP (comparative operator), and a scalar value (value).

The attribute set A is a set of attributes, in other words, the attribute set A can represent a table of a relational database. For example, a set of attributes of "name" and "age" etc., which is {name, age}, can represent a "table" composed of "name" and "age".

A pair (A, C) of the attribute set A and the condition set C represents a "view". A "view" is a virtual table which is made by retrieving or joining a part of a table. For example, if a conditional expression indicates "40 or more years old", (A, C) indicates a view that has retrieved only the part satisfying the condition of "40 or more years old" from the table, which is the attribute set A. Note that "name", "age", etc. indicated here are examples of the attributes and the attributes are not limited to "name" and "age".

Note that the types of the comparative operator COP or the logical operator are as abovementioned, thus the types of those operator is expressed by the following formula.

$$COP := \text{``<''} | \text{``>''} | \text{``=''} | \text{``<=''} | \text{``>=''} | \text{``≠''}$$

$$LOP := \text{``and''} | \text{``or''} | \text{``not''}$$

Restructuring a relational database is to update schema sets of the database through schema operations. In this document, the schema operations for restructuring relational database are categorized and defined to 4 types, which are; join, divide, create/delete, and convert type.

The "join" is an operation to merge two or more schemata into one schema and is equivalent to a full outer join of a SQL (Structured Query Language) sentence.

The "divide" is an operation to divide one schema into two or more schemata.

The "create" is an operation to define and generate a new schema. The "delete" is a deleting operation of an existing schema.

The "convert type" is an operation to convert a view into a table.

FIG. 1 is an explanatory diagram illustrating an example of database restructure. In FIG. 1, a case is explained as an example in which a table 1 and a table 2 are merged into one table 3 according to relevance and usage frequency of data. In the example illustrated in FIG. 1, two tables with a common attribute X are restructured to be one table. In the restructure, the schema structure can be modified to optimize the database as described above.

There are many database restructuring systems suggested heretofore (see for example patent document 1 (U.S. Pat. No. 7,007,006), patent document 2 (U.S. Pat. No. 6,546,381), patent document 3 (United States Patent Publication No. 2005/0198019A1) and patent document 4 (United States Patent Publication No. 2005/0198013A1)). In these systems of a related art, an access log in the database is analyzed to automatically generate and recommend a view (materialized view, indexed view) according to an access cost, so as to improve the access efficiency to data. That is, a new schema (view) is created to restructure the database.

Further, patent document 5 (Japanese Unexamined Patent Publication No. 2006-127418) describes a computer system which determines a plan for a database management system to access a database based on the cost.

DISCLOSURE OF INVENTION

Technical Problem

In the database restructuring system of a related art, a database is restructured based only on the access cost, thus it has been difficult to design flexible database structure according to the limitation of resources, amount or frequency of access request, and data characteristics stored in the database.

Moreover, it is preferable to be able to estimate the cost after a restructure without actually restructuring a database.

Therefore, the present invention aims to provide a database restructuring support system, a database restructuring support method, and a database restructuring support program product which enable to estimate the cost after the restructure without actually restructuring the database, and also enable users to flexibly design the database structure after the restructure.

Technical Solution

A database restructuring system according to the present invention that calculates an evaluation value in the case of changing a structure of a database using a storage cost and an access cost. The storage cost indicates a capacity of a storage device necessary to store data and the access cost indicates a capacity of the storage device accessed by a relation operation. The database restructuring system includes a database storage unit that stores a database, where the database is a set of schemata which are tables or views, a log storage unit that stores an access log of the database, a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header, an input unit that inputs information to specify an existing schema inside the database stored to the database storage unit, a definition of a new schema generated from the existing schema, and information to specify an existing schema remaining after a restructure, an existing schema storage cost calculation unit that sets a storage cost of a view to 0, and calculates a storage cost of an existing table by calculating a number of tuples of a table that can be stored to one block using the catalog information and dividing a number of tuples of the existing table by the number of tuples that can be stored to one block, an existing database storage cost calculation unit that calculates a storage cost of the database before a restructure by obtaining a sum of the storage cost of each view and each table, where the storage cost of each view and each table is calculated by the existing schema storage cost calculation unit, a new schema storage cost calculation unit that sets a storage cost of a new schema to 0 if the new schema is a view and calculates a storage cost of a new schema if the new schema is a table by calculating a number of tuples of the new schema, calculating a number of tuples that can be stored to one block using the catalog information, and dividing the number of tuples of the new schema by the number of tuples that can be stored to one block, a new database storage cost calculation unit that calculates the storage cost of the database after the restructure by obtaining a sum of the storage cost of the new schema and the storage cost of the existing schema remaining after the restructure, an existing schema access cost calculation unit that calculates an access cost of the existing schema by calculating a number of tuples accessed by a relation operation for each SQL sentence representing a relation operation in an access log of a schema to calculate the access cost therefor, converting the number of tuples for each relation operation into a number of blocks using the catalog information, calculating an access cost for each SQL sentence by obtaining a sum of each block, and obtaining a sum of the access cost of the each SQL sentence, an existing database access cost calculation unit that calculates an access cost of the database before the restructure by obtaining the sum of the access cost calculated for the each SQL sentence in the access log calculated by the existing schema access cost calculation unit, a new schema access cost calculation unit that calculates an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks using the calculated number of types of the value of the attribute, the number of tuples of the new schema, and the catalog information, and calculates a sum of the access cost for the each SQL sentence, a new database access cost calculation unit that calculates the access cost of the database after the restructure by calculating a sum of an access cost for each SQL sentence in an access log of an existing schema not used to create the virtual access log and the access cost calculated by the new schema access cost calculation unit for each SQL sentence in the virtual access log, and an integrated cost estimate unit that calculates an integrated cost of the database before the restructure by integrating the access cost and the storage cost of the database before the restructure, calculates an integrated cost of the schema before the restructure by integrating the access cost and the storage cost of the schema before the restructure, calculates an integrated cost of the database after the restructure by integrating the access cost and the storage cost of the database after the restructure, and calculates an integrated cost of the schema after the restructure by integrating the access cost and the storage cost of the schema after the restructure.

Further, a method of supporting a restructure of a database according to the present invention applied to a database restructuring support system that calculates an evaluation value in the case of changing a structure of a database by using a storage cost and an access cost. The storage cost indicates a capacity of a storage device necessary to store data and the access cost indicates a capacity of the storage device accessed by a relation operation. The database restructuring support system includes a database storage unit that stores a database, where the database is a set of schemata which are tables or views, a log storage unit that stores an access log of the database, a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header, and an input unit that inputs information to specify an existing schema inside the database stored to the database storage unit, a definition of a new schema generated from the existing schema, and information to specify an existing schema remaining after a restructure. The method includes an existing schema storage cost calculation unit setting a storage cost of a view to 0, and calculating a storage cost of an existing table by calculating a number of tuples of a table that can be stored to one block using the catalog information and dividing a number of tuples of the existing table by the number of tuples that can be stored to one block, an existing database storage cost calculation unit calculating a storage cost of the database before a restructure by obtaining a sum of the storage cost of each view and each table, where the storage cost of each view and each table is calculated by the existing schema storage cost calculation unit, a new schema storage cost calculation unit setting a storage cost of a new schema to 0 if the new schema is a view and calculating a storage cost of a new schema if the new schema is a table by calculating a number of tuples of the new schema, calculating a number of tuples that can be stored to one block using the catalog information, and dividing the number of tuples of the new schema by the number of tuples that can be stored to one block, a new database storage cost calculation unit calculating the storage cost of the database after the restructure by obtaining a sum of the storage cost of the new schema and the storage cost of the existing schema remaining after the restructure, an existing schema access cost calculation unit calculating an access cost of the existing schema by calculating a number of tuples accessed by a relation operation for each SQL sentence representing a relation operation in an access log of a schema to calculate the access cost therefor, converting the number of tuples for each relation operation into a number of blocks using the catalog information, calculating an access cost for each SQL sentence by obtaining a sum of each block, and obtaining a sum of the access cost of the each SQL sentence, an existing database access cost calculation unit calculating an access cost of the database before the restructure by obtaining the sum of the access cost calculated for the each SQL sentence in the access log calculated by the existing schema access cost calculation unit, a new schema access cost calculation unit calculating an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks using the calculated number of types of the value of the attribute, the number of tuples of the new schema, and the catalog information, and calculating a sum of the access cost for the each SQL sentence, a new database access cost calculation unit calculating the access cost of the database after the restructure by calculating a sum of an access cost for each SQL sentence in an access log of an existing schema not used to create the virtual access log and the access cost calculated by the new schema access cost calculation unit for each SQL sentence in the virtual access log, and an integrated cost estimate unit calculating an integrated cost of the database before the restructure by integrating the access cost and the storage cost of the database before the restructure, calculating an integrated cost of the schema before the restructure by integrating the access cost and the storage cost of the schema before the restructure, calculating an integrated cost of the database after the restructure by integrating the access cost and the storage cost of the database after the restructure, and calculating an integrated cost of the schema after the restructure by integrating the access cost and the storage cost of the schema after the restructure.

Further, a database restructuring support program product according to the present invention is mounted to a computer that calculates an evaluation value in the case of changing a structure of a database using a storage cost and an access cost, where the storage cost indicates a capacity of a storage device necessary to store data and the access cost indicates a capacity of the storage device accessed by a relation operation, and the computer includes a database storage unit that stores a database, where the database is a set of schemata which are tables or views, a log storage unit that stores an access log of the database, a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header, and an input unit that inputs information to specify an existing schema inside the database stored to the database storage unit, a definition of a new schema generated from the existing schema, and information to specify an existing schema remaining after a restructure, and the database restructuring support program product causes the computer to execute an existing schema storage cost calculation process that sets a storage cost of a view to 0, and calculates a storage cost of an existing table by calculating a number of tuples of a table that can be stored to one block using the catalog information and dividing a number of tuples of the existing table by the number of tuples that can be stored to one block, an existing database storage cost calculation process that calculates a storage cost of the database before a restructure by obtaining a sum of the storage cost of each view and each table, where the storage cost of each view and each table is calculated by the existing schema storage cost calculation process, a new schema storage cost calculation process that sets a storage cost of a new schema to 0 if the new schema is a view and calculates a storage cost of a new schema if the new schema is a table by calculating a number of tuples of the new schema, calculating a number of tuples that can be stored to one block using the catalog information, and dividing the number of tuples of the new schema by the number of tuples that can be stored to one block, a new database storage cost calculation process that calculates the storage cost of the database after the restructure by obtaining a sum of the storage cost of the new schema and the storage cost of the existing schema remaining after the restructure, an existing schema access cost calculation process that calculates an access cost of the existing schema by calculating a number of tuples accessed by a relation operation for each SQL sentence representing a relation operation in an access log of a schema to calculate the access cost therefor, converting the number of tuples for each relation operation into a number of blocks using the catalog information, calculating an access cost for each SQL sentence by obtaining a sum of each block, and obtaining a sum of the access cost of the each SQL sentence, an existing database access cost calculation process that calculates an access cost of the database before the restructure by obtaining the sum of the access cost calculated for the each SQL sentence in the access log calculated by the existing schema access cost calculation process, a new schema access cost calculation process that calculates an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks using the calculated number of types of the value of the attribute, the number of tuples of the new schema, and the catalog information, and calculates a sum of the access cost for the each SQL sentence, a new database access cost calculation process that calculates the access cost of the database after the restructure by calculating a sum of an access cost for each SQL sentence in an access log of an existing schema not used to create the virtual access log and the access cost calculated by the new schema access cost calculation process for each SQL sentence in the virtual access log, and an integrated cost estimate process that calculates an integrated cost of the database before the restructure by integrating the access cost and the storage cost of the database before the restructure, calculates an integrated cost of the schema before the restructure by integrating the access cost and the storage cost of the schema before the restructure, calculates an integrated cost of the database after the restructure by integrating the access cost and the storage cost of the database after the restructure, and calculates an integrated cost of the schema after the restructure by integrating the access cost and the storage cost of the schema after the restructure.

ADVANTAGEOUS EFFECTS

According to the present invention, the cost after the restructure can be estimated without actually restructuring the database and users can flexibly design the database structure after the restructure.

BEST MODE FOR CARRYING OUT THE INVENTION

Exemplary embodiments of the present invention are described hereinafter with reference to the drawings.
First Exemplary Embodiment
FIG. 2 is a block diagram illustrating a first exemplary embodiment of the present invention. The database restructuring support system of the present invention is provided with an input device 101, a support processing device 110, and a storage device 120 that stores information. Further, an output device 102 is connected to the support processing device 110. The output device 102 may be provided as a part of the database restructuring support system.

The input device 101 is for example a keyboard or a mouse. The changes of the structure of a database are input to the input device 101 by the user. Specifically, information which specifies a schema in the database already stored in the storage device 120 (the schema hereinafter referred to as an existing schema), and a SQL sentence which defines a new schema to be generated from the specified existing schema are input to the input device 101. These inputs indicate that the database is to be changed from the present structure to the structure including the new schema.

The storage device 120 stores a database 122, which is to be restructured, and a log DB121, which is history information of accesses to the database 122. The storage device 120 is realized by a hard disk, for example. An access log is explained hereinafter. The access log is a set of queries written in a SQL sentence. An operation to the database is referred to as a question (or query) here. An SQL sentence is composed of a select, where, and from sentences, etc. If an operation using a SQL sentence is performed to a database, the SQL sentence is added to the access log of the database. A set of the accumulated access logs of the database is the log DB121.

FIG. 3 is an explanatory diagram illustrating an example of the access log. Suppose that the schema structure of the database is {r1, r2, r3, r4}. That is, the schemata included in the database are r1, r2, r3, and r4. Access logs q1, q2, and q3 illustrated in FIG. 3 are the examples of the access logs of this database. Each of the access logs q1, q2, and q3 illustrated in FIG. 3 includes a select, where, and from sentences. q1 is an access log relevant to the schemata q1 and q2. q2 is an access log relevant to the schemata q1 and q4. q3 is an access log relevant to q3.

Note that to denote a set or an element belonging to the set, the set is denoted by an uppercase letter and the elements of the set are denoted by lowercase letters.

Further, the database 122 also includes catalog information. FIG. 4 is an explanatory diagram illustrating the catalog information. The catalog information is the number of tuples in a table, a header size of the tuple, an attribute set of the table, sizes of each attribute belonging to the attribute set of the table, the number of types (variations) of values of each attribute belonging to the attribute set of the table, a block size of a file system, and a size of a block header. Of these items, the number of tuples in the table, the header size of the tuple, the attribute set of the table, the size of each attribute belonging to the attribute set of the table, and the number of types (variations) of values of each attribute belonging to the attribute set of the table are referred to as the catalog information of a database. Further, the block size of the file system and the size of the block header are referred to as the catalog information of the file system. The file system is a management area of the database 122. The catalog information is used for calculating a storage cost and an access cost. The unit of the header size of the tuple, the size of each attribute belonging to the attribute set of the table, the block size of the file system, and the size of the block header is a byte, for example. A case in which the unit of each of the abovementioned sizes is a byte is explained as an example hereinafter.

Note that each sign illustrated in FIG. 4 indicates respective information. For example, an attribute set of a table r is denoted as "r.A" as illustrated in FIG. 4. The number of types of values of an attribute ai belonging to an attribute set A of the table r is denoted as "V(r, ai)", as illustrated in FIG. 4. V(r, ai) is the number of types of the values actually included in the database 122 as values of the attribute ai, and is not the types of values that ai can take. For example, in a case there is "age" as an attribute of a certain table, and the range that the value can take is 18 to 60, if there are only 3 types of values as the "age" in the table r of the database 122, which are "40, "45", and "48", V(r, age) is 3.

The catalog information is included in the database 122. Therefore, the storage device 122 stores the catalog information along with the database 122.

The support processing device 110 is an information processing device which operates in accordance with a program. The support processing device 110 includes an integrated cost estimate unit 111, a storage cost estimate unit 112, an access cost estimate unit 113, and a visualizing unit 114.

The storage cost estimate unit 112 calculates each storage cost before and after the restructure. The storage cost is the number of blocks of the storage device 122 which is required to store data in a table.

The storage cost estimate unit 112 calculates a storage cost of schemata and a storage cost of a database for each storage cost before and after the restructure, and returns each of the calculated storage costs to the integrated cost estimate unit 111. A database is a set of schemata, thus the storage cost of the database is the sum of the storage costs of each schema.

The access cost estimate unit 113 analyzes the log DB121, and calculates each access cost before and after the restructure. The access cost is the sum of the number of blocks of the storage device 122 accessed by a relation operation to refer to data stored in the database. The relation operations are projection, selection, join, product, union, and intersection.

The access cost estimate unit 113 calculates an access cost of a schema and an access cost of a database for each access cost before and after the restructure, and returns each of the calculated access costs to the integrated cost estimate unit 111.

When calculating the storage cost after the restructure, the storage cost estimate unit 112 estimates the storage cost without actually restructuring the database, and the estimated result is considered as the storage cost after the restructure. Similarly, when calculating the access cost after the restructure, the access cost estimate unit 113 estimates the access cost without actually restructuring the database, and the estimated result is considered as the access cost after the restructure. The details of the processes by the storage cost estimate unit 112 and the access cost estimate unit 113 are described later.

The integrated cost estimate unit 111 calculates an integrated cost which is a cost of integrating the access and the storage cost. The integrated cost estimate unit 111 integrates the storage cost and the access cost of the database before a restructure to calculate the integrated cost of the database before the restructure. Similarly, the integrated cost estimate unit 111 integrates the storage cost and the access cost of the database after the restructure to calculate the integrated cost of the database after the restructure. Further, the integrated cost estimate unit 111 integrates the storage cost and the access cost of the schema before the restructure to calculate the integrated cost of the schema before the restructure. Similarly, the integrated cost estimate unit 111 integrates the storage cost and the access cost of the schema after the restructure to calculate the integrated cost of the schema after the restructure. The integrated cost estimate unit 111 passes to the visualizing unit 114 each access cost and each storage cost calculated by the access cost estimate unit 113 and the storage cost estimate unit 112, and each integrated storage cost calculated by integrating those costs.

The visualizing unit 114 creates an image of a graph illustrating the integrated cost, the access cost, and the storage cost, and creates a document for displaying the image. This document is a Web page written in HTML (HyperText Markup Language) etc., for example. Hereinafter, a case in which the visualizing unit 114 creates a Web page is described as an example.

The visualizing unit 114 creates an image of a graph illustrating the integrated cost, the access cost, and the storage cost of schemata. At this time, the visualizing unit 114 creates a graph to compare the integrated costs, the access costs, and the storage costs of multiple kinds of schemata. The multiple kinds of schemata are for example an existing schema and a new schema. The visualizing unit 114 creates a document of a screen to display the graph and schema structure information of each schemata in which the costs thereof are illustrated in a graph. The schema structure information indicates the attributes of the schema, and if the schema is a view, a condition is included in the schema structure information.

Further, the visualizing unit 114 creates an image of a graph illustrating the integrated cost, the access cost, and the storage cost of a database. At this time, the visualizing unit 114 creates a graph to compare the integrated costs, the access costs, and the storage costs of multiple kinds of schemata. The multiple kinds of schemata are for example a database, which is a set of existing schemata, and a database including a new schema. The visualizing unit 114 creates a document of a screen to display the graph, the database structure information of each database, and the schema structure information of each schema included in the database. The database structure information indicates the schemata included in each database. That is, the database structure information indicates that which set of schema the database is. The schema structure information is already explained.

Further, the visualizing unit 114 specifies a hyperlink to the document to display the costs of the database in the document to display the costs of the schemata. Similarly, the visualizing unit 114 specifies a hyperlink to the document to display the costs of the schemata in the document to display the costs of the database.

The visualizing unit 114 outputs the created document to the output device 102. The visualizing unit 114 outputs the document to the output device 102 in response to a request from the output device 102, for example.

The output device 102 is an information processing device mounted with a browser and provided with a display device that displays a screen with the browser based on the document created by the visualizing unit 114.

The integrated cost estimate unit 111, the storage cost estimate unit 112, the access cost estimate unit 113, and the visualizing unit 114 are realized by CPUs operating in accordance with a program, for example. The integrated cost estimate unit 111, the storage cost estimate unit 112, the access cost estimate unit 113, and the visualizing unit 114 may be realized by the same CPU. The program is stored to a program storage device (not illustrated) provided to the support processing device 110. The CPU reads the program and operates in accordance with the program as the integrated cost estimate unit 111, the storage cost estimate unit 112, the access cost estimate unit 113, and the visualizing unit 114. Moreover, the output device 102 may be a display device, a browser may be provided to the processing support device 100, and the CPU may display the Web page on the display device (the output device 102) according to the browser.

An operation is explained next.

FIG. 5 is a flowchart illustrating an example of the processing process of the present invention. First, the integrated cost estimate unit 111 inputs information to specify an existing schema from a user via the input device 101 and a SQL sentence defined by a new schema, which is generated by integrating the specified existing schema (step A1). That is, in the step S1, a set of existing schemata (referred to as D) in the database 122 stored in the storage device 120 is selected, and the definition of a new schema set D' generated by operating the existing schema set D is input.

FIG. 6 illustrates an example of an existing schema and a new schema generated from the existing schema. Suppose that in the existing schema, there is an existing schema r1 having name and department as attributes, and an existing schema r2 having ID, name, age, and address as attributes. For example, in a case a user tries to find out an integrated cost, a storage cost, and an access cost when creating a new schema s having ID, name, department, age, and address as attributes from the existing schemata r1 and r2. In this case, the integrated cost estimate unit 111 inputs the information to specify the existing schemata r1 and r2 via the input device 101. Further, a definition statement 71 (see FIG. 6) which defines the new schema s is input. The input mode of the information to specify the existing schema or the definition statement is not limited in particular.

Moreover, in the step A1, the integrated cost estimate unit 111 also inputs a name of the new schema via the input device 101. Furthermore, the information to specify an existing schema remaining after the restructure is also input to the integrated cost estimate unit 111.

In the step A1, the integrated cost estimate unit 111 also inputs parameters for weighting the access cost and the storage cost when calculating the integrated cost from the access cost and the storage cost.

After the step A1, the integrated cost estimate unit 111 passes the information input in the step S1 (the information to specify a set of existing schemata and the definition statement of the new schema) respectively to the storage cost estimate unit 112 and the access cost estimate unit 113. The integrated cost estimate unit 111 also passes the name of the new schema input in the step A1 to the access cost estimate unit 113. Further, the integrated cost estimate unit 111 also passes the information to specify the existing schema remaining after the restructure to the storage cost estimate unit 112. Then, the integrated cost estimate unit 111 specifies the storage cost estimate unit 112 to calculate the storage costs before and after the restructure. The integrated cost estimate unit 111 also specifies the access cost estimate unit 113 to calculate the access costs before and after the restructure.

The storage cost estimate unit 112 calculates each storage cost before and after the restructure and returns them to the integrated cost estimate unit 111 (step S2). That is, the present storage costs of individual new schemata and the storage cost of the database are calculated, and the storage cost of the new schema and the storage cost of the database in the case of generating the new schema are calculated.

Moreover, the access cost estimate unit 113 calculates each access cost before and after the restructure and returns them to the integrated cost estimate unit 111 (step A3). That is, the present access costs of individual new schemata and the access cost of the database are calculated, and the access cost of the new schema and the access cost of the database in the case of generating the new schema are calculated.

Then the integrated cost estimate unit 111 calculates the integrated cost, which is calculated by integrating the storage cost and the access cost (step A4). In the step A4, the integrated cost estimate unit 111 integrates the storage costs and the access costs before the restructure for each schema to calculate the integrated costs for each schema before the restructure. Further, the integrated cost estimate unit 111 integrates the storage costs and the access costs after the restructure for each schema to calculate the integrated costs after the restructure for each schema. The integrated cost estimate unit 111 integrates the storage costs and the access costs of the database before the restructure to calculate the integrated costs of the database before the restructure. The storage cost and the access cost of the database after the restructure are integrated to calculate the integrated cost of the database after the restructure.

Next, the visualizing unit 114 creates an image of a graph illustrating the integrated cost, the access cost, and the storage cost, and creates a document of a screen to display schema structure information of each schema together with the image. Further, the visualizing unit 114 creates an image of a graph illustrating the integrated costs, the access costs, and the storage costs for the database, which is a set of existing schemata, and the database including a new schema, and creates a document of a screen to display the image, the database structure information of each database, and the schema structure information of each schema included in the database (step A5).

The output device 102 displays the screen to display the graph, the schema structure information, and the database structure information according to the document created by the visualizing unit 114. A user checks this screen to confirm the access costs, the storage costs, and the integrated costs of the schema or the entire database when creating a new schema assumed by a user, also checks a change from the present access costs, storage costs, and integrated costs, so that the user can examine whether the new schema is appropriate in terms of cost.

Next, the calculation of the costs is explained.
First, an operation for the access cost estimate unit 113 to calculate the present (which is before the restructure) access cost is described. The access cost estimate unit 113 computes an access cost for each SQL sentence used as an access log. This SQL sentence indicates a relation operation. That is, this SQL sentence is a SQL sentence like q1, q2, and q3 illustrated in FIG. 3. The access cost estimate unit 113 calculates an access cost of a schema as the sum of access costs calculated for each SQL sentence regarding the schema in which the access cost is calculated therefore. Further, the access cost estimate unit 113 calculates an access cost of a database as the sum of access costs calculated for each SQL sentence in the access log of the database.

FIG. 7 is a flowchart illustrating an example of an operation to calculate the access cost for each SQL sentence indicating a relation operation. The access cost estimate unit 113 converts a SQL sentence q indicating a relation operation into a query tree indicating a series of relation operations (step S1). Generally, a select sentence included in a SQL sentence corresponds to projection, a where sentence corresponds to selection or join, and a from sentence corresponds to join, union, or product. Therefore, in the step S1, the access cost estimate unit 113 generates a query tree indicating each relation operation in the SQL sentence as a tree structure, in which a table or a view is a leaf, join, union, product, and intersection are parent nodes of the leaf, projection is a root, and a selection is an intermediate node. The method to convert a SQL sentence into a group of relation operation (query tree) is described in non-patent document 1.

After the step S1, the access cost estimate unit 113 calculates the number of tuples after individual relation operation (step S2). The number of tuples after a certain relation operation is the number of tuples accessed by the next relation operation. Further, the number of tuples accessed by the first relation operation is the number of tuples of the table to be operated. The access cost estimate unit 113 calculates the number of tuples after a relation operation in order from the node closest to the leaf (table) of the query tree in the step S2.

For example, suppose that a certain relation operation is performed first to a table of 1000 tuples, and the number of tuples after the relation operation is 100. The number of tuples accessed by this relation operation is 1000 tuples. If the next relation operation is performed, the number of tuples accessed by the relation operation is 100 tuples, which is the number of tuples after the last relation operation. Thus, by calculating the number of tuples after each relation operation, the sum of the number of tuples to be accessed can be calculated.

Further, the number of tuples before relation operation is the number of tuples after the last relation operation. The number of tuples before the relation operation performed first is the number of the tables to be operated.

The access cost estimate unit 113 calculates the number of tuples after relation operation for each relation operation included in the query tree generated in the step S1. The calculation of the number of tuples after relation operation is explained. Note that the calculation of the number of tuples after relation operation is described in non-patent document 1. In the following explanation, the number of tuples after relation operation is referred to as T. Further, r and suffixed r such as r1 and r2 indicate relations to be operated. Moreover, $V(r, a)$ is the number of types of values of the attribute that appears in the relation r. $V(r, a)$ is not the number of types of values that the attribute a can take but the number of types of values included in a relation to be actually operated. Furthermore, c shall be a scalar. $T(r)$ is the number of tuples of the relation to be operated, and $T(r)$ in the right side of each formula indicated below is the number of tuples before relation operation. The access cost estimate unit 113 calculates the number of tuples as described below according to the types of the relation operation, which are projection, selection, product, union, and intersection after the relation operation.

The calculation in the case of projection ($\pi$) is explained. If the relation operation is a projection ($\pi$), the access cost estimate unit 113 calculates the number of tuples after relation operation by the following formula 4.

$$T=T(r) \qquad \text{(Formula 4)}$$

That is, if the relation operation is a projection ($\pi$), the number of tuples after relation operation is equivalent to the value of the number of tuples before relation operation.

Next, the calculation in the case of selection ($\sigma$) is explained. If the relation operation is a selection ($\sigma$), the access cost estimate unit 113 calculates the number of tuples after relation operation according to a selective conditional expression.

If the selective conditional expression is a=c (that is, the condition is "the value of the attribute a is c"), the access cost estimate unit 113 calculates the number of tuples after relation operation by the following formula 5. That is, the number of tuples after relation operation is calculated by dividing the number of tuples before relation operation by the number of types of the values of the attribute a that appears in the relation r.

$$T=T(r)/V(r,a) \qquad \text{(Formula 5)}$$

If the selective conditional expression is a≠c (that is, the condition is "the value of the attribute a is not c"), the access cost estimate unit 113 calculates the number of tuples after relation operation by the following formula 6.

$$T=T(r)-T(r)/V(r,a) \qquad \text{(Formula 6)}$$

If the selective conditional expression is a>c (that is, the condition is "the value of the attribute a is larger than c"), the access cost estimate unit 113 calculates the number of tuples after relation operation by the following formula 7. That is, the number of tuples after relation operation is calculated by dividing the number of tuples before relation operation by 3.

$$T=T(r)/3 \qquad \text{(Formula 7)}$$

If the relation operation is a selection according to the product (AND) of multiple selective conditional expressions, the access cost estimate unit 113 calculates the number of tuples after relation operation by the following formula 8.

$$T=(T1*T2*T3*\ldots*Tn)/(T(r)^\wedge(n-1)) \qquad \text{(Formula 8)}$$

Note that in the formula 8, Ti(i=1-n) is the number of tuples after relation operation in the case of performing a selection based only on the ith selective conditional expression. The formula 8 indicates that T(r) is multiplied to the product of a ratio of the number of tuples after relation operation in the case of performing a selection based only on each condition to the number of tuples T(r) before relation operation (Ti/T(r)). The sign "*" indicates multiplication and "^" indicates power index.

If the relation operation is a selection according to the sum (AND) of multiple selective conditional expressions, the access cost estimate unit 113 calculates the number of tuples after relation operation by the following formula 9.

$$T=T(r)*(1-(1-T1/T(r))(1-T2/T(r))\ldots(1-Tn/T(r))) \qquad \text{(Formula 9)}$$

T1-Tn of the formula 9 are same as T1-Tn of the formula 8. That is, they are the numbers of tuples after relation operation in the case of performing a selection based only on the ith selective conditional expression.

The calculation in the case of join is explained. Note that join is considered to be a natural join and the order of join shall not be considered.

When joining r1 and r2 under the condition that the value of the attribute a of the schema r1 is equal to the value of the attribute b of the schema r2 (r1.a=r2.b) (there is one common attribute), the access cost estimate unit 113 calculates the number of tuples after relation operation by the following formula 10. As an example to join r1 and r2 under the condition that the value of the attribute a of the schema r1 is equal to the value of the attribute b of the schema r2, there is a case, for example, in which a first table having attributes of "ID, name, age, address" and a second table having attributes of "employee ID, wage, bonus" are joined under the condition that ID in the first table is equivalent to the employee ID in the second table.

$$T=T(r1)*T(r2)/\max(V(r1,a),V(r2,b)) \qquad \text{(Formula 10)}$$

T(r1) and T(r2) are the numbers of tuples of r1 and r2, respectively. max ( ) is a function indicating the largest value among the values inside the parenthesis. Therefore, max (V(r1, a), V(r2, a)) indicates the larger value between V(r1, a) and V(r2, a). Note that when combining a sign of a schema and a sign of an attribute using a period as in r1.a, it indicates the attribute of the schema.

When joining r1 and r2 under the condition of r1.a1=r2.b1, r1.a2=r2.b2, . . . , r1.an=r2.bn (there are 2 or more common attributes), the access cost estimate unit 113 calculates the number of tuples after relation operation by the following formula 11.

$$T=T(r1)*T(r2)/(\max(V(r1,a1),V(r2,b1))*\max(V(r1,a2),V(r2,b2))*\ldots*\max(V(r1,an),V(r2,bn))) \qquad \text{(Formula 11)}$$

Further, when joining r1, r2, r3, . . . , rn, the access cost estimate unit 113 calculates P1 and P2 by the following formulas 12 and 13 to calculate the number of tuples after relation operation.

[Formula 1]

$$p1 = \Pi_i^n v(r_i,a_1) * \Pi_i^n v(r_i,a_2) * \ldots * \Pi_i^n v(r_i,a_m) \qquad \text{(Formula 12)}$$

$$P2 = \min(V(ri,a1)) * \min(V(ri,a2)) * \ldots * \min(V(ri,am)) \qquad \text{(Formula 13)}$$

Note that min( ) in the formula 13 is a function to indicate the smallest value when i changes. Further, (ri, aj)≠0.1 and j are following values, respectively.

i=1, . . . , n
j=1, . . . , m

Furthermore, aj is an attribute that satisfies aj∈r1∪r2∪ . . . ∪rn.

If the access cost estimate unit 113 calculates P1 and P2, the access cost estimate unit 113 calculates P, which is the value calculated by dividing P1 by P2, and calculates the number of tuples after relation operation (join, in this example) using P(=P1/P2) by the following formula 14.

$$T=T(r1)*T(r2)\ldots T(rn)/P \qquad \text{(Formula 14)}$$

Next, the calculation in the case of product is explained. If the relation operation is a product of r1 and r2 (r1×r2), the access cost estimate unit 113 calculates the number of tuples after relation operation by the following formula 15.

$$T=T(r1)*T(r2) \qquad \text{(Formula 15)}$$

Next, the calculation in the case of union is explained. If the relation operation is a union of r1 and r2 (r1∪r2), the access cost estimate unit 113 calculates the number of tuples after relation operation by the following formula 16.

$$T=(T(r1)+T(r2)+\max(T(r1),T(r2)))/2 \qquad \text{(Formula 16)}$$

Next, the calculation in the case of intersection is explained. If the relation operation is an intersection of r1 and r2 (r1∩r2), the access cost estimate unit 113 calculates the number of tuples after relation operation by the following formula 17. That is, the number of tuples after relation operation is calculated considering that it is a join of relation operations. Note that rk in the formula 17 is a result of join (join of relation operations) of r1 and r2.

$$T=T(rk) \quad \text{(Formula 17)}$$

After calculating the number of tuples after relation operation for each relation operation included in the query tree generated in the step S1 (after the step S2), the access cost estimate unit 113 uses the catalog information of the database and the catalog information of the file system to convert the number of tuples T accessed by each relation operation into the number of blocks (the number hereinafter referred to as B). Specifically, the access cost estimate unit 113 converts the number of tuples T into the number of blocks B by the following formula 18 (step S3).

$$B=INT(T/int((b-bh)/(h+\Sigma size(ai)))) \quad \text{(Formula 18)}$$

In the formula 18, b is the block size of the file system, and bh is the size of the block header (see FIG. 4). Further, h is the header size of a tuple, size(ai) is the size of individual attribute belonging to a tuple t=(a1, a2, . . . , an), and Σsize(ai) is the total (total of the size of each attribute of a1 . . . an). Moreover, INT( ) in the formula 18 is a function to round out the value inside the parenthesis, and int( ) is a function to truncate the value inside the parenthesis. For example, INT(10.2)=11 and int(10.2)=10.

After respectively converting the number of tuples T accessed by each relation operation into the number of blocks, the access cost estimate unit 113 calculates the sum of the number of blocks as an access cost cost(q) of a SQL sentence q (step S4). The total of the number of blocks is the access cost cost(q) of the SQL sentence q.

FIG. 8 is an explanatory diagram illustrating a computation example of an access cost of a SQL sentence. As illustrated in FIG. 8, an access cost of a SQL sentence 81 including a select, from, and where sentences shall be calculated. Further, the number of tuples T of a table written in the SQL sentence 81 shall be 10000. The access cost estimate unit 113 uses the table (employee table in this example) written in the SQL sentence 81 as a leaf and converts the SQL sentence 81 into a query tree 82. In this example, the query tree 82 is created that includes a selection (σage>40) which is a relation operation, and a projection (πname, address), and takes the employee table as a leaf.

The number of tuples before the first relation operation (σage>40) is the number of tuples of the table (employee table), and is 10000. The number of tuples accessed by the relation operation (σage>40) is 10000. The access cost estimate unit 113 calculates the number of tuples after the first relation operation (σage>40) using this number of tuples. This relation operation is "selection" and the selective conditional expression is "age>40", thus the access cost estimate unit 113 calculates the number of tuples using the formula 7 by the calculation of 10000/3. The number of tuples 10000/3 after this relation operation (σage>40) is the number of tuples accessed by the next projection (πname, address).

The access cost estimate unit 113 calculates each of the abovementioned 10000 and 10000/3 in accordance with the formula 18, which are accessed by relation operations. At this time, the access cost estimate unit 113 uses the values of the catalog information included in the database 122 for b, bh, h, and size (ai) included in the formula 18.

The access cost estimate unit 113 calculates the number of blocks Bσ accessed among 10000 tuples at the time of selection using the formula 18. Suppose that Bσ=1000 blocks in this example. Similarly, the access cost estimate unit 113 calculates the number of blocks Bπ accessed among 10000/3 tuples at the time of projection using the formula 18. Suppose that Bπ=334 blocks in this example.

The access cost estimate unit 113 calculates the sum of the numbers of blocks in the step S4 to calculate the access cost of the given SQL sentence 81. In this example, it is 1000+334=1334 blocks.

The access cost estimate unit 113 calculates the access cost similarly for other SQL sentences included in the access log.

The access cost estimate unit 113 calculates the access costs of schemata, and the access cost of the database from the access cost of each SQL sentence calculated in the steps S1 to S4.

The access log of the schema to calculate the access cost is referred to as Q(S). The access cost of the schema is the total of the access costs of the SQL sentences included in Q(S). Accordingly, the access cost estimate unit 113 calculates the access cost of the schemata as the total of the access costs of the SQL sentences included in Q(S). That is, the access cost estimate unit 113 calculates the access cost of the schemata by the following formula 19. Note that COSTaccess(S) is the access cost of the schema.

[Formula 2]

$$\text{cost}_{access}(s)=\Sigma_{qi \in Q(s)}\text{cost}(qi) \quad \text{(Formula 19)}$$

The access cost of the database is the total of the access costs of the SQL sentences included in the access log of the database. Accordingly, the access cost estimate unit 113 calculates the access cost of the database as the total of the access costs of the SQL sentences included in the access log (referred to as Q(D)S) of the database. That is, the access cost estimate unit 113 calculates the access cost of the database by the following formula 20. Note that COSTaccess(D) is the access cost of the database.

[Formula 3]

$$\text{cost}_{access}(s)=\Sigma_{qi \in Q(D)}\text{cost}(qi) \quad \text{(Formula 20)}$$

Next, an operation is explained in which the access cost estimate unit 113 calculates access costs of schemata and a database after the restructure. Note that the access cost estimate unit 113 calculates the access cost after the restructure without actually restructuring the database. As described above, the access cost estimate unit 113 uses an access log and catalog information to calculate the access costs, however the access log and the catalog information are not prepared for the database not actually restructured, thus the access cost estimate unit 113 creates a virtual access log and catalog information of the database after the restructure from the access log and the catalog information before the restructure. Note that the storage cost estimate unit 112 creates a part of the virtual catalog information (the number of tuples in a new table). The access cost calculated using the virtual access log and the catalog information is referred to as a virtual access cost.

After generating the virtual catalog information and the virtual access log, the access cost estimate unit 113 may calculate the access log of schemata or a database after the restructure using the virtual catalog information and the virtual access log. Note that it may be necessary to calculate the access cost of the database using an access log of a schema that has no change before and after the restructure. An operation for creating the virtual catalog information and the virtual access log is explained hereinafter.

First, an operation to generate the virtual catalog information is explained. As illustrated in FIG. 4, the catalog information of a table includes the number of tuples of a table, the header size "h" of the tuple, the size "size (ai)" of an attribute, and the number of types of values of each attribute, etc., however only the number of tuples and the number of types of values of an attribute change by the restructure of the database. Further, the catalog information of a file system does not change by the restructure of the database. Therefore, the catalog information before the restructure is used as is except the number of tuples and the number of types of values of attributes.

The storage cost estimate unit 112 generates the number of tuples of a new schema among the virtual catalog information. As illustrated in FIG. 5, the access cost estimate unit 113 performs the step A3 after the step A2 by the storage cost estimate unit 112, thus the access cost estimate unit 113 may use the number of tuples of a new schema calculated by the storage cost estimate unit 112 for each new schema as the number of tuples of the new schema. The operation of the storage cost estimate unit 112 to calculate the number of tuples of the new schema is described later.

The access cost estimate unit 113 calculates the number of the types of values of an attribute "V(s, a)" according to the generation mode of a new schema. There are "join", "division", "change of a type of an existing schema", and "generation of a new schema by a SQL sentence f(R)" as generation modes of the new schema, and calculation of V(s, a) for the 4 cases is explained hereafter.

If the generation mode of a new schema s is join of the existing schemata r1 and r2, that is, the new schema s is created by joining the existing schemata r1 and r2, the number of types of values of the attribute a of the new schema s V(s, a) is calculated as follows depending on which existing schema the attribute a belongs thereto. Hereafter, V(s, a) is referred to as a virtual V(s, a).

If a∈r1.A∩r2.A, that is, if the attribute a of the new schema is the attribute of the existing schema r1 and is also the attribute of r2, the access cost estimate unit 113 calculates the virtual V(s, a) by the following formula 21.

$$V(s,a)=V(r1,a)+V(r2,a)-V(r1,a)*V(r2,a)/\max(V(r1,a),V(r2,a))$$ (Formula 21)

If a∈r1.A, that is, the attributes a of the new schema is only the attribute of r1 among the existing schemata r1 and r2, the access cost estimate unit 113 calculates virtual V(s, a) by the following formula 22.

$$V(s,a)=V(r1,a)$$ (Formula 22)

If a∈r2.A, that is, the attributes a of the new schema is only the attribute of r2 among the existing schemata r1 and r2, the access cost estimate unit 113 calculates virtual V(s, a) by the following formula 23.

$$V(s,a)=V(r2,a)$$ (Formula 23)

Although the calculation of virtual V(s, a) in case a new schema is generated by a join has been explained so far, the calculation of the virtual V(s, a) in the case of generating a new schema by a division is explained next. In the case of dividing the existing schema r into new schemata s1 and s2, the access cost estimate unit 113 calculates the number of types of values of each attribute as follows.

If a⊂s1.A, that is, the attribute a is the attribute of s1 among the new schemata s1 and s2, the access cost estimate unit 113 calculates virtual V(s1, a) by the following formula 24.

$$V(s1,a)=V(r,a)$$ (Formula 24)

If it is a∈s2.A, that is, if the attribute a is the attribute of s2 among the new schemata s1 and s2, the access cost estimate unit 113 calculates the virtual V(s2, a) by the following formulas 25.

$$V(s2,a)=V(r,a)$$ (Formula 25)

If the type of the existing schema r is changed to generate the new schema s (that is if a view is converted into a table), the number of the types of the values of the attribute does not change, thus V(s, a)=V(r, a). Accordingly, the virtual V(r, a) already included in the catalog information may be virtual V(s, a).

If the new schema s is generated using the SQL sentence f(R), the number of types of the values of the attribute a in the new schema can be calculated based on the idea that the change of the number of types of the attribute value is the same rate as the change of the number of tuples. f(R) is a SQL sentence indicating a combination of relation operations ("join", "selection", "projection", etc.) of a set of existing schemata R. The access cost estimate unit 113 converts the SQL sentence f(R) into a query tree, and calculates the ratio of the number of tuples of the existing schema set and the number of tuples of the new schema. Then, the virtual V(s, a) is calculated with the ratio as a change rate of the number of types of the attribute value.

The operation by the access cost estimate unit 113 to change the SQL sentence f(R) into a query tree is the same as in the step S1 (see FIG. 7). The access cost estimate unit 113 calculates the number of tuples after relation operation in order from the node closest to the leaf of the query tree, and considers the number of tuples after the last relation operation as the number of tuples T(s) of the new schema s.

The access cost estimate unit 113 calculates the number of tuples of the existing schema set R as follows. Each schema belonging to the existing schema set R is referred to as r1, r2, ..., rn. Accordingly, suppose that R={r1, r2, ..., rn}. The access cost estimate unit 113 calculates the number of tuples T(R) of the existing schema set R by the calculation of T(R)=T(r1)+T(r2)+...T(rn).

T(s)/T(R), in which T(s) is divided by T(R) is the ratio of the number of tuples of the existing schema set to the number of tuples of the new schema.

Further the number of types of values of the attribute a in the existing schema set V(R, a) can be expressed by the following formula.

$$V(R,a)=\max(V(r1,a),V(r2,a),...,V(rn,a))$$

Therefore, the access cost estimate unit 113 calculates the virtual V(s, a) in the case of generating the new schema s using the SQL sentence f(R) by the following formula 26 using the abovementioned V(R, a) and T(s)/T(R).

$$V(s,a)=V(R,a)*T(s)/T(R)$$ (Formula 26)

FIG. 9 is an explanatory diagram illustrating a computation example of the virtual V(s, a) in the case of generating the new schema s using the SQL sentence f(R). In this example, suppose that the SQL sentence f(R) is the SQL sentence 81 (see FIG. 9) including a select, from, and where sentences. Further, suppose that a table called an employee table exists in the existing schema set.

The access cost estimate unit 113 generates the query tree 82 from the SQL sentence 81 by the same process as in the step S1. The access cost estimate unit 113 calculates the number of tuples after relation operation in order from the node closest the leaf of the query tree, and takes the number of tuples after the last relation operation as the number of tuples T(s) of the new schema s. In this example, T(s)=3334. Moreover, T(R)=10000. Then, the ratio of the number of tuples of the existing schema set and the number of tuples of the new schema is 3334/10000. Therefore, if an attribute is "name", for example, V(s, name)=V(employee table, name)*3334/

10000. Similarly, if the attribute is "address", for example, V(s, address)=V(employee table, address)*3334/10000.

Next, an operation to generate the virtual access log is explained. The schema set R={r1, r2, ..., rn} selected in the database structure input (the step A1) is converted into the new schema set S by an integration operation of the schemata. The access cost estimate unit 113 generates the virtual access log, which is considered as an access log of the new schema set S, as follows. The virtual access log in the new schema set S is referred to as Q'(S). FIG. 10 is a flowchart illustrating the operation to generate the virtual access log.

The access cost estimate unit 113 collects logs including ri∈R, from the access log Q(R) in R and generates a converting set Qc(R). Specifically, the access cost estimate unit 113 collects the logs of the existing schema used for generation of a new schema among the access log Q(R) of R. A set of logs collected here is the converting set Qc(R). For example, if the new schema s is defined as a join of the existing schemata r1 and r2, the access cost estimate unit 113 collects logs of the existing schemata r1 and r2 from the access log and considers the logs as the converting set Qc(R).

After generating the converting set Qc(R), the access cost estimate unit 113 converts the access log q belonging to Qc(R) into a query (query for S) q' in S, and generates a virtual access log Q'(S) for the new schema set S. Note that q' converted from q is a virtual access log. The access cost estimate unit 113 converts the access log q into the query q' according to the generation mode of the new schema. As already explained, there are "join", "division", "change of a type of an existing schema", and "generation of a new schema by a SQL sentence f(R)" as the generation modes of the new schema, and the conversions into the query q' in the case of these 4 modes are explained hereinafter.

If a new schema is a join of the existing schemata r1 and r2, the access cost estimate unit 113 generates the query q' by rewriting names of the existing schemata r1 and r2 written in the access log q which belongs to the converting set Qc(R) to the name of the new schema (step S12). That is, q' is generated, in which the string indicating the name of the existing schema in q is converted to the string indicating the name of the new schema. The name of the new schema is input at the step A1.

Next, the access cost estimate unit 113 forms the query q (step S13). Specifically, if a relation name is only the name of the new schema s in a select sentence in the query q', the access cost estimate unit 113 omits the description of the name. Further, if there is 2 or more descriptions of the new schema s in a from sentence in the query q', the access cost estimate unit 113 deletes the descriptions after the first description of the new schema s. That is, the access cost estimate unit 113 deletes duplicated description concerning the new schema s from the from sentence. Moreover, if there is an obvious conditional expression in a where statement, the access cost estimate unit 113 deletes the conditional expression. That is, the conditional expression having same descriptors in the right and left of the sign is deleted from a where sentence.

To divide the existing schema r into the new schemata s1 and s2, the access cost estimate unit 113 generates the query q' in which the select, from, and where sentence written in the access log q belonging to the converting set Qc(R) (step S14) are rewritten. Accordingly, each rewritten sentence write in the access log q is considered as q'. In the step S14, firstly the access cost estimate unit 113 extracts the attribute set A of the existing schema r written in the select, from, and where sentence, and rewrites the schema name in accordance with the following rules.

If the extracted attribute set A is a subset of the attribute set (referred to as s1.A.) of the new schema s1, that is, A⊂s1.A, the access cost estimate unit 113 rewrites the schema name of the existing schema r written in the access log q to the schema name of the new schema s1. Hereinafter, the schema name of the existing schema r is referred to as "r", and the schema names of the new schemata s1 and s2 are referred to as "s1" and "s2".

If the extracted attribute set A is not a subset of the attribute set s1.A of the new schema s1 and also the attribute set A is a subset of the attribute set s2.A of the new schema s2 (that is, A⊂s2.A), the access cost estimate unit 113 rewrites the name of the existing schema "r" written in the access log q to the name of the new schema "s2".

If the extracted attribute set A is neither a subset of the attribute set s1.A of the new schema s1 nor is a subset of the attribute set s2.A of the new schema, the access cost estimate unit 113 divides the extracted attribute set A into A1 (⊂s1.A) and A2((⊂s2.A). That is, the access cost estimate unit 113 divides the attribute set A into a set A1 of the attribute belonging to the attribute set s1.A and a set A2 of the attribute belonging to the attribute set s2.A. For example, suppose that the extracted attribute set A={a1, a2, a3}, and the attribute set s1.A of the new schema s1={a1, a2}, and the attribute set s2.A of the new schema s2={a3}. In this case, the access cost estimate unit 113 divides A into A1={a1, a2} and A2={a3}. Note that the attribute belonging to both s1.A and s2.A is included in both A1 and A2.

After dividing the attribute set A as described above, the access cost estimate unit 113 rewrites the name of the attribute or the schema written in the select, from, and where sentence in the access log as explained below. The names of the attributes are expressed using " ". For example, the name of the attribute is expressed as "a" and the name of the attribute s1.a of the new schema s1 is expressed as "s1.a".

If the attribute a written in the select sentence is an element of A1 (that is, a∈A1), the access cost estimate unit 113 rewrites the name of the attribute "a" written in the select sentence to "s1.a". Similarly, if the attribute a written in the select sentence is an element of A2 (that is, a∈A2), the access cost estimate unit 113 rewrites the name of the attribute "a" to "s2.a". Further, the attribute a written in the select sentence belongs to each of A1 and A2, the access cost estimate unit 113 rewrites the name of the attribute "a" to "s1.a".

Moreover, the access cost estimate unit 113 rewrites the name of the schema "r" written in the from sentence to the names of the new schemata s1 and s2, which are "s1, s2".

If the attribute a written in the where sentence is an element of A1 (that is, a∈A1), the access cost estimate unit 113 rewrites the name of the attribute "a" written in the where sentence to "s1.a". Similarly, if the attribute a written in the where sentence is an element of A2 (that is, a∈A2), the access cost estimate unit 113 rewrites the name of the attribute "a" to "s2.a". Further, if the attribute a written in the where sentence belongs to each of A1 and A2, the access cost estimate unit 113 adds the description of "s1.a=s2.a".

The access log in which the select, from, and where sentence are respectively rewritten in the step S14 is referred to as the query q'. Next, the access cost estimate unit 113 forms the query q' (step S15). Specifically, if a relation name is only the names of the new schemata "s1" or "s2" in the select sentence in the query q', the access cost estimate unit 113 omits the description of "s1" and "s2". Further, the access cost estimate unit 113 deletes duplicated description regarding the new schemata s1 and s2 in the from sentence in the query q'. Moreover, if there is an obvious conditional expression in the where statement, the access cost estimate unit 113 deletes the conditional expression. That is, the conditional expression having same descriptors in the right and left of the sign is deleted from the where sentence.

To generate the new schema s using the SQL sentence f(R), the query q', which is a virtual access log, is generated according to the SQL sentence f(R) (step S16). The operation of the access cost estimate unit 113 in the step S16 is explained hereinafter.

If the SQL sentence f(R) indicates to delete the existing schema, it is not necessary to calculate the access cost of the new schema, thus the access log relating the schema to be deleted is deleted and the access log q is not converted into the query q' in S.

If the schema s newly generated is a view, it is considered that the access cost does not change, and Qc(R) is considered as a virtual access log Qc(R).

Further, if a table is newly generated, that is, the new schema s is a table (including a materialized view) defined by the SQL sentence f(R), the access cost estimate unit 113 compares the SQL sentence f(R) to define the table and the access log q, and generates q' by rewriting the part existing in q that corresponds to f(R) to s. This process is performed as follows to be specific.

The access cost estimate unit 113 converts the SQL sentence f(R) and the access log q respectively into query trees according to a divide and rule strategy. The query tree converted from the SQL sentence f(R) is referred to as G(f(R)). Moreover, the query tree converted from the access log q is referred to as G(q). The divide and rule strategy is the method to break down a query for multiple schemata into queries that access to only one or two schemata (the query referred to as a small query), so that when the result of the divided queries are combined, the same result can be obtained as the original query. The access cost estimate unit 113 generates query trees including the query trees of the divided small queries. The divide and rule strategy is described in non-patent document 2.

If the query tree G(f(R)) is included in the query tree G(q), the access cost estimate unit 113 replaces the part in the query tree G(q) that corresponds to the query tree G(f(R)) with s. The replaced query tree is referred to as a reduced query tree G'(q).

Next, the access cost estimate unit 113 converts the reduced query tree G' (q) into a SQL sentence. The SQL sentence converted from the reduced query tree G'(q) is the query q' (virtual access log). Generally, the leaf of a query tree corresponds to the from sentence. Selection and projection respectively correspond to the where sentence and the select sentence. If the parent nodes of leafs are relation operations with join, union, and product, these nodes also correspond to the from sentence. The access cost estimate unit 113 converts the reduced query tree G'(q) into a SQL sentence according to this correspondence relationship. The access cost estimate unit 113 creates a leaf or a leaf and a from sentence represented by its parent node, creates a where sentence represented by a node indicating selection or join, and creates a select sentence represented by a node indicating projection so as to convert the reduced query tree G'(q) into the SQL sentence (query q'). The conversion from a query tree into a SQL sentence is described in non-patent documents 1 and 2.

FIG. 11 is an explanatory diagram illustrating a specific example of the process to generate the query q' in case the new schema s is a table (including a materialized view) defined by the SQL sentence f(R). The sign π indicated in the query tree of FIG. 11 indicates a projection. Further, FIG. 12 is the sign indicating a join. The sign illustrated in FIG. 12 is used as a sign to indicate a join in the query tree in FIG. 11 Suppose that the access logs q and f(R) are the SQL sentences indicated in the upper part of FIG. 11.

The access cost estimate unit 113 generates the query tree G(q) from the access log q illustrated in FIG. 11 based on the division and rule strategy. The query tree G(q) illustrated in FIG. 11 can be broken down to a query tree G(q0) of a small query q0 and a query tree G(q1) of a small query q1. Further, the access cost estimate unit 113 generates the query tree G(f(R)) from f(R) illustrated in FIG. 11 based on the division and rule strategy.

The section (G(q0)) surrounded by the dotted line in G(q) is equivalent to G(f(R)). Therefore, the query tree of the access log G(f(R)) is included in the query tree G(q), thus the access cost estimate unit 113 replaces the part corresponding to G(f(R)) in the query tree G(q) (which is G(q0) surrounded by the dotted line) with s which represents the new schema. The access cost estimate unit 113 derives q' by converting the query tree obtained by the replacement into a SQL sentence.

If the type of the existing schema r is changed to generate the new schema s (that is, a view is converted into a table), the access cost estimate unit 113 converts the name of the existing schema "r" written in the access log q' into the name of the new schema "s" (step S17). As a result, the query q' is obtained.

As described above, the query q' generated by the process illustrated in FIG. 10 is a virtual access log Q' (S).

After generating the virtual catalog information and the virtual access log Q'(S), the access cost estimate unit 113 uses the virtual catalog information and the virtual access log Q'(S) to calculate an access cost of a schema and a database after the restructure. This process is the same as the process to calculate an access cost of a schema and a database before the restructure except the point that the catalog information and the access log used in the calculation are the virtual catalog information and the virtual access log Q'(S).

To calculate the access cost of the database after the restructure, the access cost estimate unit 113 calculates the sum of access costs for each SQL sentence in the access log of an existing schema not used in the creation of the virtual access log and the access costs calculated for each SQL sentence in the virtual access log, so as to calculate the access cost of the database after the restructure. For example, suppose that the database before the restructure includes the schemata r1, r2, and r3, and the databases after the restructure include the schemata s1 and r3. In this example, the schema s1 shall be a join of r1 and r2. The access cost estimate unit 113 selects an access log Qc relevant to r1 and r2 from the existing access log Q(R). The access cost estimate unit 113 converts this access log (converting set) Qc(R) to generate the virtual access log Q'(S). In this case, the access logs of the database after the restructure are Q-Qc(R) u∪Q'(S). The access cost of the database may be calculated from such access logs, thus the access cost estimate unit 113 may calculate the sum of the access costs for each SQL sentence in the access log of the existing schema not used in the creation of the virtual access log and the access costs calculated for each SQL sentence in the virtual access log.

The access cost estimate unit 113 calculates the access costs of the schemata and the database before and after the restructure in the step A3 (see FIG. 5). As already explained, the storage cost estimate unit 112 calculates the number of tuples of the virtual catalog information for each new schema. The storage cost estimate unit 112 calculates the storage costs of the schemata and the database before and after the restructure in the step A2 (see FIG. 5). Note that the number of tuples of a new schema calculated virtually is also calculated in the step A2. The process of the storage cost estimate unit 112 in the step A2 is explained hereinafter.

First, the operation of the storage cost estimate unit 112 to calculate the present storage cost (that is, before the restructure) is explained. As already explained, the storage cost is the number of blocks of the storage device 122 which is required to store data of a table. The storage cost estimate unit 112 calculates the storage cost using the catalog information of a database and the catalog information (see FIG. 4) of a file system.

Suppose that the table to calculate the storage cost is t and there are a1, a2, . . . , an as attributes of the table t. Further, the storage cost of the table t is referred to as COSTstorage (t). The storage cost estimate unit 112 calculates the storage cost COSTtstorage of the table t (t) by following formula 27.

[Formula 4]

$$cost_{storage}(t) = \text{INT}\left(\frac{k}{\text{int}\left(\frac{b-bn}{b+\sum_{1}^{n}size(ai)}\right)}\right) \quad \text{(Formula 27)}$$

In the formula 27, k is the number of tuples of the table t. size (ai) is the size of the attributes of the table t. For example, size(a1) is the size of the first attribute of the table t. h is the header size of the tuple. The tuple k, the size of the attribute size(ai), and the header size of the tuple are included in the catalog information of the database. In FIG. 4, the number of tuples of the table is referred to as T(r). To denote the above-mentioned k according to the notation of FIG. 4, it is T(t). In the formula 27, b is the size of a block of the file system and bh is the header size of the block. b and bh are included in the catalog information of the file system. In this example, the unit of size(ai), h, b, and bh is a byte.

The formula 27 indicates that the number of tuples of the table stored in 1 block is calculated using the catalog information, and the storage cost is calculated by dividing the number of tuples k of the existing table by the calculated number of tuples.

FIG. 13 is an explanatory diagram illustrating a computation example of the storage cost. Suppose that the tuple size of the table t to be calculated is 98 bytes. The tuple size is the value calculated by adding the header size of the tuple to the sum of the sizes of each attribute of the table t. Suppose that the block size of one block is 1024 bytes, and the size of the block header is 12 bytes. Further, suppose that the number of tuples of the table t is 10000. Then, the storage cost is calculated as follows by the formula 27.

$$INT(10000/int((1024-12)/98)) = 1000$$

Thus, in this example, the storage cost COSTstorage (t) is 1000 blocks. The value of the int( ) function in the abovementioned formula indicates the number of tuples that can be stored to one block. In the abovementioned example, the number of tuples that can be stored to one block is int(1024−12)(/98)=10 tuples. The number of blocks of the table t 10000 is divided by the number of tuples 10 that can be stored to one block, so that the number of blocks to be the storage cost can be calculated.

The storage cost estimate unit 112 calculates the storage cost of each schema included in the database by the calculation of the formula 27. Note that the storage cost of a view is 0. There are tables and views for the schemata, however the storage cost of the table is calculated by the formula 27 and the storage cost of the view shall be 0.

Next, the storage cost estimate unit 112 calculates the storage cost of the database as the sum of the storage costs of the schemata included in the database. Suppose that database D={s1, s2, . . . , sn}. Accordingly, suppose that there are s1, s2, . . . , sn as schemata belonging to a database D. The storage cost of individual schema si belonging to D is calculated as mentioned above. That is, if si is a table, the storage cost is calculated by the formula 27 and if si is a view, the storage cost is 0. The storage cost COSTstorage(D) of the database is the sum of the storage costs of the schemata included in the database, and the storage cost estimate unit 112 calculates the storage cost COSTstorage(D) of the database by the following formula 28.

[Formula 5]

$$cost_{storage}(D) = \Sigma_{si \in D} cost_{storage}(Si) \quad \text{(Formula 28)}$$

Next, an operation of the storage cost estimate unit 112 to calculate the storage costs of the schemata and the database after the restructure is explained. Database restructure by a schema operation does not influence the file system, thus even after the restructure, the block size b and the header size of the block bh do not change. Further, such database restructure is performed by operating the existing schema, thus the values of the size of each attribute of schema and the header size of the tuple before the restructure can be continuously used after the change. Therefore, if the number of tuples after the restructure is estimated, the cost of a new schema can be calculated by the formula 27. In the present invention, the number of tuples of the new schema after the restructure can be estimated without actually restructuring the database, and the storage cost of the new schema is calculated using the number of tuples. The storage cost of the new schema calculated in this way is referred to as a virtual storage cost.

Hereinafter, the storage cost estimate unit 112 calculates the virtual cost of a new schema according to the generation mode of the new schema. As already explained, there are "join", "division", "generation of a new schema by a SQL sentence f(R)", and "change of a type of an existing schema" as the generation modes of the new schema, and the estimate calculation of the number of tuples in the case of these 4 modes are explained hereinafter. If x is a schema, T(x) represents the number of tuples of x.

If the new schema s is created by a join of the existing schemata r1 and r2, the storage cost estimate unit 112 calculates the number of tuples T(s) of the new schema s by the following formula 29.

$$T(s) = (T(r1) + T(r2) + \max(T(r1), T(r2)))/2 \quad \text{(Formula 29)}$$

If the new schemata s1 and s2 are obtained by dividing the existing schema r, the storage cost estimate unit 112 considers that both the numbers of tuples T(s1) and T(s2) of the new schemata s1 and s2 are equivalent values to the number of tuples T(r) of the existing schema r. That is, T(s1)=T(s2)=T(r).

To generate the new schema s using the SQL sentence f(R), the storage cost estimate unit 112 calculates the number of tuples of the new schema as follows.

If the existing schema is deleted by f(R) and the new schema is not generated, the storage cost estimate unit 112 does not calculate the storage cost of the new schema, and the number of tuples is not estimated.

If the new schema created by f(R) is a view, the storage cost estimate unit 112 sets the storage cost of the view to 0. Thus the number of tuples is not estimated.

If the new table is created by f(R), that is, the new schema is a table (including a materialized view), the storage cost estimate unit 112 considers the result number of tuples returned by the SQL sentence f(R) which defines the new table s as the number of tuples of the new schema. For example, suppose that the new table s is defined by the SQL sentence illustrated in FIG. 14. Further, T(r1)=1000, T(r2)=10000, V(r1, ID)=1000, and V(r2, ID)=10000. In this case, the number of tuples returned by the SQL sentence illustrated in FIG. 14 is 1000, thus the number of tuples of the new table is 1000.

The result number of tuples returned by the SQL sentence can be calculated by the same process as the process to calculate the number of tuples by the access cost estimate unit 113 in the steps S1 and S2 (see FIG. 7).

If the type of the existing schema r is changed to generate the new schema s (that is, a view is converted into a table), the storage cost estimate unit 112 calculates the number of tuples of the new view by the same calculation in the case of newly creating a table by the SQL sentence f(R). That is, the SQL sentence f(R) is analyzed to calculate the number of tuples of the new view by the same process as the process of the access cost estimate unit 113 to calculate the number of tuples in the steps S1 and S2 (see FIG. 7).

If the number of tuples of the new schema is calculated according to the generation mode of a new schema as described above, the storage cost estimate unit 112 calculates a virtual storage cost by the formula 27 using the number of tuples. The catalog information except the number of tuples may use the values used for the calculation of the storage cost of the schema before the restructure. The storage cost of the new schema newly obtained by the restructure can be obtained by the above processes. The storage cost of the schema which does not change by restructure is the same value as the storage cost of the schema before the restructure.

The storage cost estimate unit 112 calculates the storage cost of the database after the restructure. The storage cost estimate unit 112 calculates the storage cost of the database after the restructure as the sum of the storage costs of each schema included in the database after the restructure. The existing schema may be included in each schema included in the database after the restructure other than the new schema. The existing schema remaining in the database after the restructure is specified by a user in advance. The information to specify the existing schema remaining in the database after the restructure is input to the integrated cost estimate unit 111, for example, in the step A1, and the integrated cost estimate unit 111 passes the information to the storage cost estimate unit 112. The storage cost estimate unit 112 adds the storage cost of the existing schema specified beforehand by a user to the calculated cost of the new schema, so as to calculate the storage cost of the database after the restructure.

Note that if the number of tuples of the new schema is calculated as above, the storage cost estimate unit 112 passes the information of the number of tuples to the access cost estimate unit 113. As already explained, the access cost estimate unit 113 calculates the access cost after the restructure using this number of tuples.

Next, an operation of the integrated cost estimate unit 111 to calculate an integrated cost in the step S4 is explained. First, the calculation of an integrated cost of a schema is explained. The integrated cost estimate unit 111 calculates integrated costs for each schema included in the database by integrating the storage cost calculated by the storage cost estimate unit 112 and the access cost calculated by the access cost estimate unit 113. The storage cost and the access cost of a certain schema s included a database is respectively referred to as COSTstorage(s) and COSTaccess(s). The integrated cost estimate unit 111 calculates the integrated cost (referred to as COST(s)) of this schema by the following formula 30.

$$COST(s)=\alpha*COSTstorage(s)+\beta*COSTaccess(s) \quad \text{(Formula 30)}$$

In the formula 30, $\alpha$ and $\beta$ are the parameters for weighting the access cost and the storage cost, and are input to the input device 101 from a user in the step A1. $\alpha$ is a parameter for weighting the storage cost, and $\beta$ is a parameter for weighting the access cost. As indicated in the formula 30, the integrated cost estimate unit 111 calculates the sum of the value calculated by multiplying COSTstorage(s) by $\alpha$, and the value calculated by multiplying COSTaccess(s) by $\beta$ as the integrated cost. Accordingly, the larger the value of $\alpha$, the calculated integrated cost emphasizes the storage cost, while the larger the value of $\beta$, the calculated integrated cost emphasizes the access cost. Therefore, a user may input a large value as $\alpha$ if the user wants to obtain an integrated cost which emphasizes the storage cost, and the user may input a large value as $\beta$ if the user wants to obtain an integrated cost which emphasizes the access cost.

The storage cost estimate unit 112 calculates integrated costs for each schema belonging to the database before the restructure by the formula 30. Similarly, integrated costs are calculated also for each schema belonging to the database after the restructure.

Next, calculation of the integrated cost of the database is explained. The integrated cost estimate unit 111 calculates the integrated cost by integrating the storage cost of the database calculated by the storage cost estimate unit 112 and the access cost of the database calculated by the access cost estimate unit 113. Suppose that the storage cost of the database and the access cost of the database are respectively COSTstorage(D) and COSTaccess(D), then the integrated cost estimate unit 111 calculates the integrated cost (referred to as COSTint(D)) of the database by the following formula 31.

$$COSTint(D)=\alpha*COSTstorage(D)+\beta*COSTaccess(D) \quad \text{(Formula 31)}$$

$\alpha$ and $\beta$ in the formula 31 and $\alpha$ and $\beta$ in the formula 30 are same parameters.

The integrated cost estimate unit 111 calculates the integrated cost COSTint(D) before the restructure from the storage cost COSTstorage(D) and the access cost COSTaccess(D) before the restructure by the formula 31. Similarly, the integrated cost estimate unit 111 calculates the integrated cost COSTint(D) after the restructure from the storage cost COSTstorage(D) and the access cost COSTaccess(D) after the restructure by the formula 31.

Next, an operation of the visualizing unit 114 to create the document of the screen to display the graph of the integrated costs, the access costs, and the storage costs.

The visualizing unit 114 creates the graph illustrating the integrated cost, the access cost, and the storage cost of the database for each structure of the database. FIG. 15 is an explanatory diagram showing an example of such graph. As illustrated in FIG. 15, the visualizing unit 114 creates a graph in which the horizontal axis indicates the database structure and the integrated cost, the access cost, and the storage cost of each database structure are plotted in the vertical axis direction. Such graph is hereinafter referred to as a database cost graph. In the example of FIG. 15, the "Present Proposal" indicates the structure of the present database before the restructure. Further, each of "Proposal 1" and "Proposal 2" indicate the structures of the database after the restructure. That is, as the database structure after the restructure, 2 kinds of structures "Proposal 1" and "Proposal 2" are specified in the step A1, and an example is illustrated in which each cost of the database structures of "Proposal 1" and "Proposal 2" are calculated as respective costs of the database after the restructure.

Moreover the visualizing unit 114 creates the graph to display each of the integrated costs, the access costs, and the storage costs of multiple kinds of schemata. FIG. 16 is an explanatory diagram illustrating an example of such graph. As illustrated in FIG. 16, the visualizing unit 114 creates a graph in which the horizontal axis indicates the schema and the integrated cost, the access cost, and the storage cost of each schema are plotted in the vertical axis direction. Such graph is hereinafter referred to as a schema cost graph. In the example illustrated in FIG. 16, the graph is illustrated in which the integrated costs, the access costs, and the storage costs of each of the existing schema r2 and the new schemata s1 and s2 are plotted. Although in FIG. 16, the graph displaying each cost of r2, s1, and s2 is illustrated, the graph to display each cost of multiple types of schemata created by the visualizing unit 114 is not limited to one kind.

The visualizing unit 114 creates the database cost graph and the schema cost graph, and creates a Web page to display the database cost graph and a Web page to display the schema cost graph.

FIG. 17 is an explanatory diagram illustrating an example of the Web page to display the database cost graph. The visualizing unit 114 includes database structure information 91 indicating schemata included in each database and schema structure information 92 indicating attributes of each schema belonging to each database in the Web page to display the database cost graph. The database structure information 91 illustrated in FIG. 17 indicates that the database to be "Present proposal" includes r1 and r2, for example. Further, the schema structure information 92 illustrated in FIG. 17 indicates that attributes of the schema s1 are ID, name, and age, for example. The database cost graph is an image and the database structure information 91 and the schema structure information 92 are strings, for example. The visualizing unit 114 creates a document to specify the display of the database cost graph, which is an image, and the database structure information 91 and the schema structure information 92, which are strings for example, in the format defined by a markup language such as HTML.

FIG. 18 is an explanatory diagram illustrating an example of the Web page to display the schema cost graph. The visualizing unit 114 includes the schema structure information 92 indicating attributes of each schema illustrated in the graph in the Web page to display the schema cost graph. The schema structure information 92 illustrated in FIG. 18 indicates that the attributes of the schema s1 are ID, name, and age, for example.

The visualizing unit 114 includes hyperlinks to other Web pages in each Web page.

The visualizing unit 114 sets hyperlinks to the Web page which displays the schema cost graph of the schema belonging to each database in the Web page to display the database cost graph of the database. In the example illustrated in FIG. 17, the strings "To proposal 1", "To proposal 2", and "To present proposal" are hyperlinked sections. The visualizing unit 114 sets the hyperlink to the Web page which displays the cost of the new schema included in the structure of "Proposal 1" in the string of "To proposal 1", for example.

The visualizing unit 114 sets the hyperlink to the Web page to display the database cost graph in the Web page to display the schema cost graph. In the example illustrated in FIG. 18, the string "database cost graph" is the hyperlinked part. The visualizing unit 114 sets the hyperlink to the Web page which displays the database cost graph in the string "To database cost graph", for example.

Note that the visualizing unit 114 sets the hyperlink to the string by writing the string in the predetermined format defined by a markup language in the Web page.

In the step S6, the output device 102 displays the Web pages in accordance with the description of the documents created by the visualizing unit 114. For example, the Web pages illustrated in FIG. 17 or FIG. 18 are displayed.

Note that in this example, a case is illustrated in which the Web page is displayed, however the screen to display the schema cost graph or the database cost graph is not limited to the Web page.

According to the present invention, the access cost and the storage cost are respectively calculated independently, so as to calculate the integrated cost by integrating the access cost and the storage cost. Therefore, a user can check whether the cost of the database is appropriate or not in consideration of both the access cost and the storage cost not only the access cost, thus the structure of the database after the restructure can be flexibly designed.

Moreover in the present invention, the access cost estimate unit 113 converts the number of tuples into the number of blocks when calculating the access cost, so as to calculate the access cost with the number of blocks as a unit. Further, the unit of the storage cost is also the number of blocks. Therefore, as the units of the access cost and the storage cost are same, it is possible to calculate the integrated cost by integrating the storage cost and the access cost.

Furthermore, $\alpha$ which is the parameter for weighting the storage cost, and $\beta$ which is the parameter for weighting the access cost are input to the integrated cost estimate unit 111 via the input device 101. Then, the integrated cost estimate unit 111 calculates the sum of the product of $\alpha$ and the storage cost, and the product of $\beta$ and the access cost as the integrated cost. Therefore, the user can set the values of $\alpha$ or $\beta$ freely and the integrated cost estimate unit 111 can calculate the integrated cost which emphasizes the storage cost or the integrated cost which emphasizes the access cost according to the parameters $\alpha$ and $\beta$ input from the user. Thus, the user can confirm a desired integrated cost, such as the integrated cost which emphasizes the storage cost or an integrated cost which emphasizes the access cost, and this facilitates to flexibly design the database structure after the restructure.

In the present invention, the storage cost and the access cost after the restructure are calculated without actually restructuring a database. That is, the storage cost estimate unit 112 estimates the number of tuples of a new schema and calculates the storage cost using the number of tuples and the existing catalog information. The access cost estimate unit 113 calculates virtual V(s, a) in the new schema, and calculates the access cost using V(s, a), the number of tuples of the new schema, and the existing catalog information. In this way, the costs can be estimated without actually restructuring the database, thus various candidates can be prepared as candidates of database structure after the restructure to easily calculate the costs for each candidate.

In the present invention, the storage cost estimate unit 112 calculates not only the storage cost of a database but the storage cost of a schema. Similarly, the access cost estimate unit 113 calculates not only the access cost of a database but the access cost of a schema. Further, the integrated cost estimate unit 111 calculates not only the integrated cost of a database but the integrated cost of a schema. As described so far, the cost of the database and the cost of the schema are calculated, thus the user can analyze not only the cost of the whole database but the cost of the schema level. As a result, the user can easily discover a schema with a large influence on the storage and the access efficiency of the database, and also support further improvement of the database.

The visualizing unit 114 creates the Web page to indicate the database cost graph and the Web page to indicate the schema cost graph, and the Web pages are displayed by the output device 102. Therefore, the user can easily determine the database structure and the storage cost, the access cost, and the integrated cost of each schema and also intuitively select and determine the optimal structure for the database.

Further, the hyperlink to the Web page indicating the schema cost graph is set in the Web page indicating the database cost graph, and the hyperlink to the Web page indicating the database cost graph is set in the Web page indicating the schema cost graph, thus this facilitates to confirm the cost of the whole database and the cost of the schema level.

Second Exemplary Embodiment

FIG. 19 is a block diagram illustrating a second exemplary embodiment of the present invention. Components identical to those in the first exemplary embodiment are denoted by reference numerals identical to those in FIG. 2 with detailed description omitted.

A database restructure support system of the second exemplary embodiment includes an input device 101, a support processing device 110, a visualizing device 130, and a storage device 120. In the second exemplary embodiment, the visualizing unit 114 is not included in the support processing device 110, but the visualizing device 130 which performs similar processes to the visualizing unit 114 is provided separately from the support processing device 110 instead of the visualizing unit 114.

The visualizing device 130 is realized for example by an information processing device which operates in accordance with a program and operates in the same way as the visualizing unit 114 in the first exemplary embodiment.

In this exemplary embodiment, the integrated cost estimate unit 111 outputs integrated costs, storage costs, access costs of each database or each schema, database structure information and schema structure information to the visualizing device 130. The visualizing device 130 creates a document of a Web page to display a data cost graph and a document of a Web page to display a schema cost graph using such information input from the integrated cost estimate unit 111, in the same way as the visualizing unit 114 in the first exemplary embodiment. The visualizing device 130 outputs the documents of each created Web pages to the output device 102, and the output device 102 displays the Web pages. The visualizing device 130 outputs the documents of the Web pages to the output device 102 in response to a request from the output device 102, for example.

Further, in this exemplary embodiment, the integrated cost estimate unit 111 may directly output texts (strings) indicating the calculated cost to the output device 102. The output device 102 displays the texts. For example, the integrated cost estimate unit 111 may output the texts to indicate the integrated costs, the storage costs, and the access costs of each database and the texts to indicate the integrated costs, the storage costs, and the access costs of each schema to the output device 102, and the display device may respectively display those texts.

At this time, the integrated cost 111 ranks each database and each schema according to the costs, and may output the texts indicating the integrated costs, the storage costs, and the access costs to the output device 102 in the ranked order. For example, each database structure (each database structure before and after the restructure) is ranked in an ascending order (or descending order) of the values of the integrated costs, and the texts indicating the integrated costs, the storage costs, and the access costs may be output to the output device 102 according to the order. To provide a specific example, if the integrated cost of the database structure before the restructure is the lowest, the texts indicating the integrated cost, the storage cost, and the access cost of the database structure before the restructure are output to the output device 102 first, and then in a similar fashion, the texts indicating the integrated costs, the storage costs, and the access costs of the other database structure are output to the output device 102.

According to this exemplary embodiment, specific values of the integrated costs, the storage costs, and the access costs can be suggested to the user as strings besides the graph. Further, by ranking the structures of each database according to the integrated costs, for example, the optimal database structure can be automatically determined.

Moreover, as the visualizing device 130 is provided as an independent device from the cost estimate device 110, the processing load of the cost estimate device 110 can be reduced, and the cost estimate device 110 can easily perform the processes such as the abovementioned ranking.

Note that also in the first exemplary embodiment, the integrated cost estimate unit 111 may directly output the texts indicating the costs to the output device 102, and the output device 102 may display the texts. Also in this case, the integrated cost estimate unit 111 ranks according to the costs in a similar way as the abovementioned case, and may output the texts indicating the integrated costs, the storage costs, the access costs of each database and each schema in the order.

In each exemplary embodiment, the database storage unit, the log storage unit, and the catalog information storage unit may be realized by the storage device 120. The input unit is realized by the input device 101. The existing schema storage cost calculation unit, the existing database storage cost calculation unit, the new schema storage cost calculation unit, and the new database storage cost calculation unit are realized by the storage cost estimate unit 112. The existing schema access cost calculation unit, the existing database access cost calculation unit, the new schema access cost calculation unit, and the new database access cost calculation unit are realized by the access cost estimate unit 113. The integrated cost estimate unit is realized by the integrated cost estimate unit 111. Further, the first parameter is realized by $\alpha$ and the second parameter is realized by $\beta$.

Industrial Applicability

The present invention is preferably applied to a device or a program to analyze database performance, a device or a program to optimize a database, or a device or a program to support design, management, and maintenance of a database.

The present application claims priority rights of and is based on Japanese Patent Application No. 2007-127261 filed on May 11, 2007 in the Japanese Patent Office, the entire contents of which are hereby incorporated by reference.

BRIEF DESCRIPTION OF DRAWINGS

FIG. 3 is an explanatory diagram illustrating an example of an access log;

FIG. 4 is an explanatory diagram illustrating catalog information;

FIG. 6 is an explanatory diagram illustrating an example of an existing schema and a new schema generated from the existing schema;

Explanation Of Reference

Figure 1:
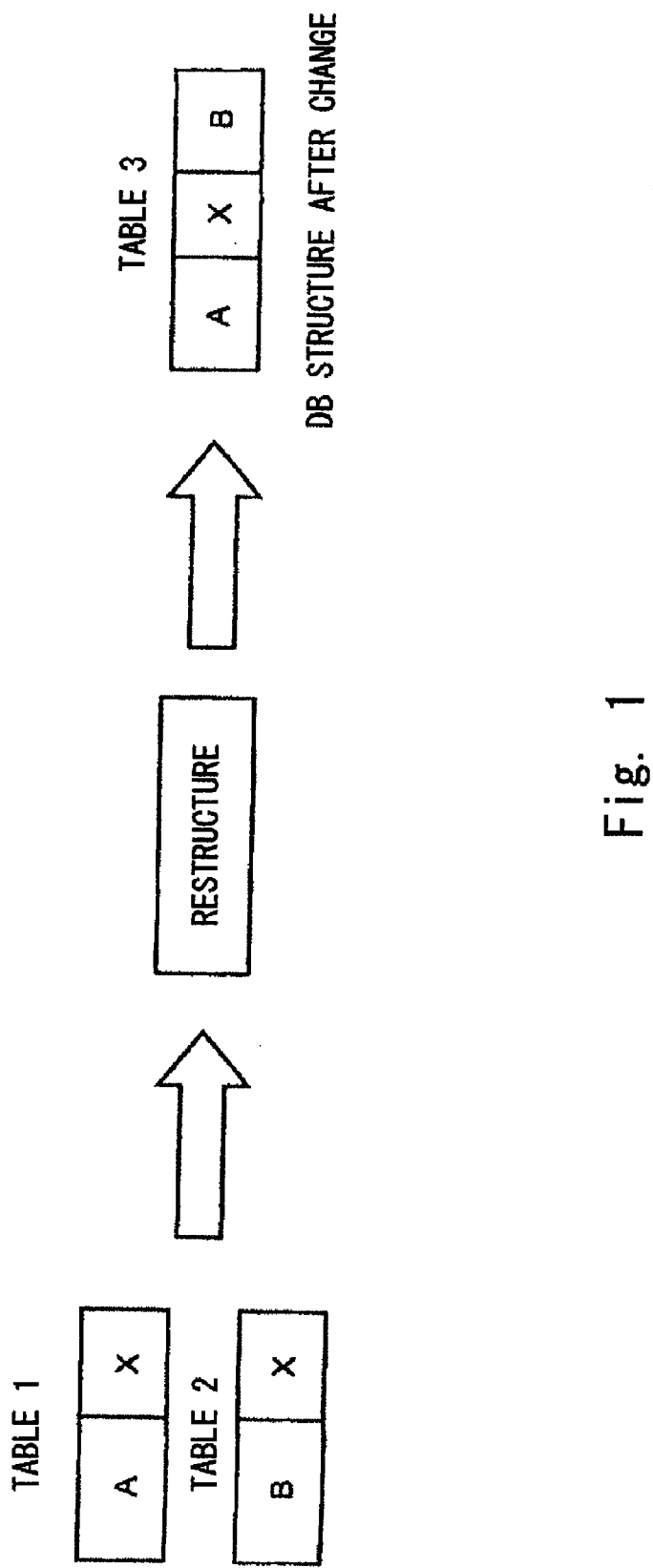
FIG. 1 is an explanatory diagram illustrating an example of a database restructure.
Figure 2:
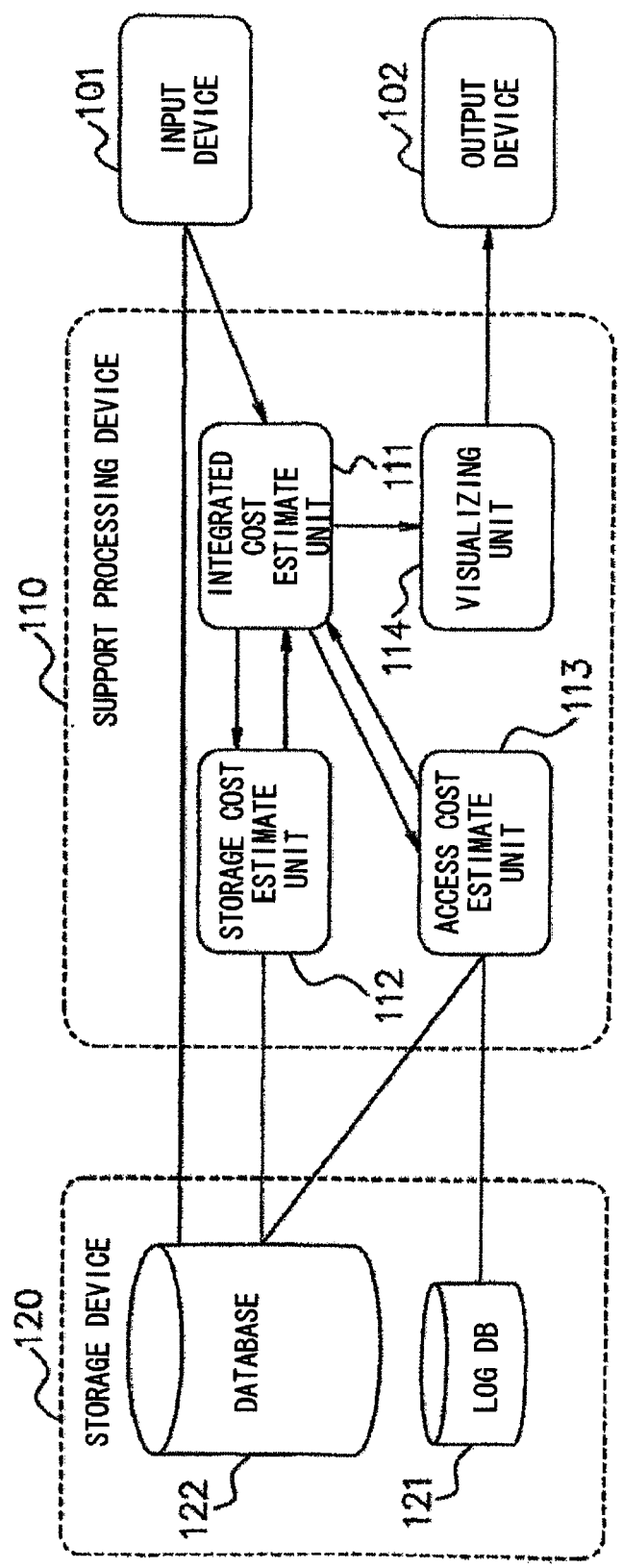
FIG. 2 is a block diagram illustrating a first exemplary embodiment of the present invention.
Figure 5:
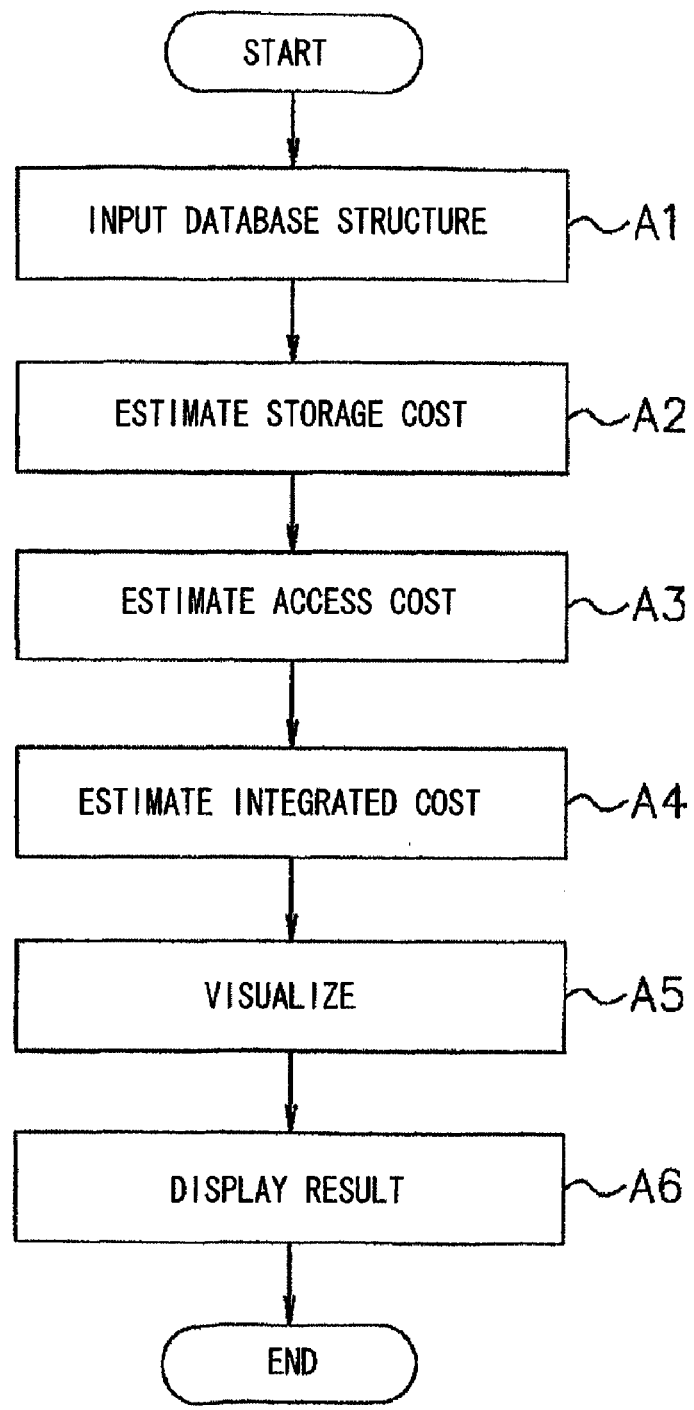
FIG. 5 is a flowchart illustrating an example of the processing process of the present invention.
Figure 7:
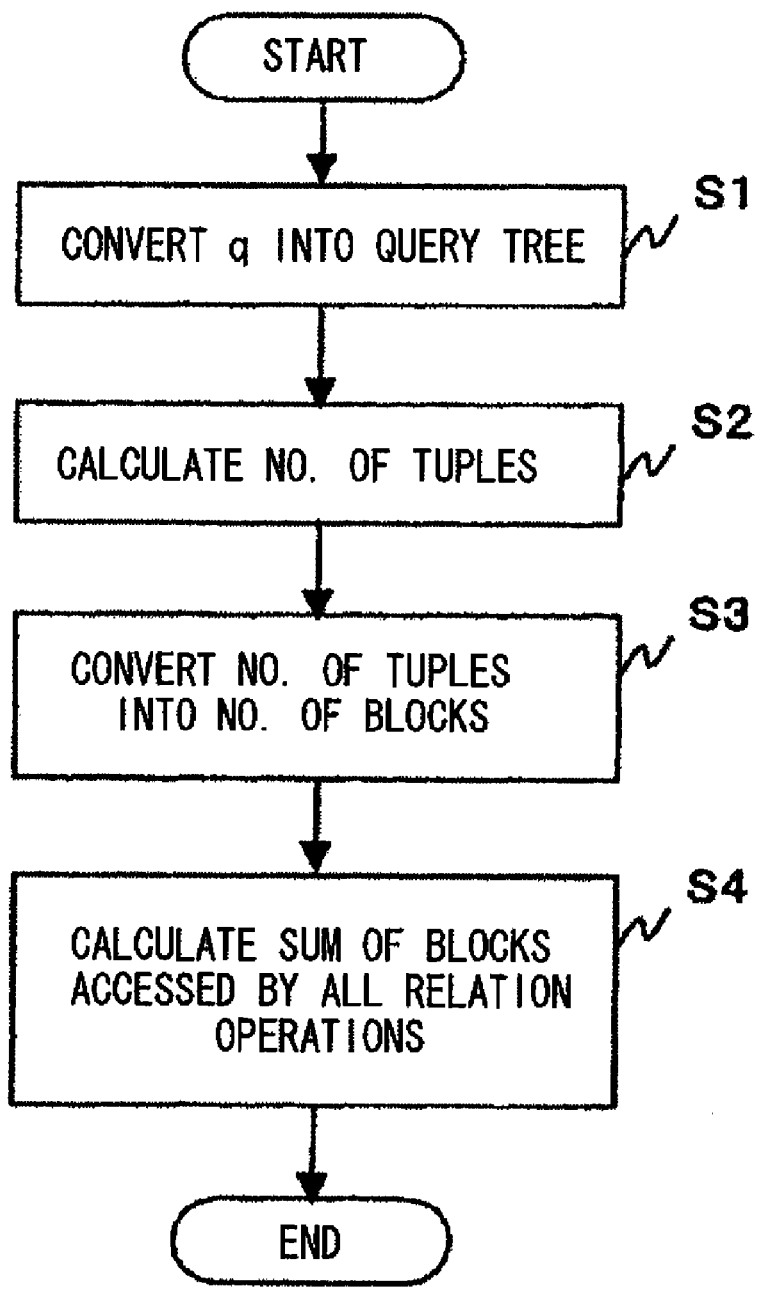
FIG. 7 is a flowchart illustrating an example of an operation to calculate an access cost for each SQL sentence.
Figure 8:
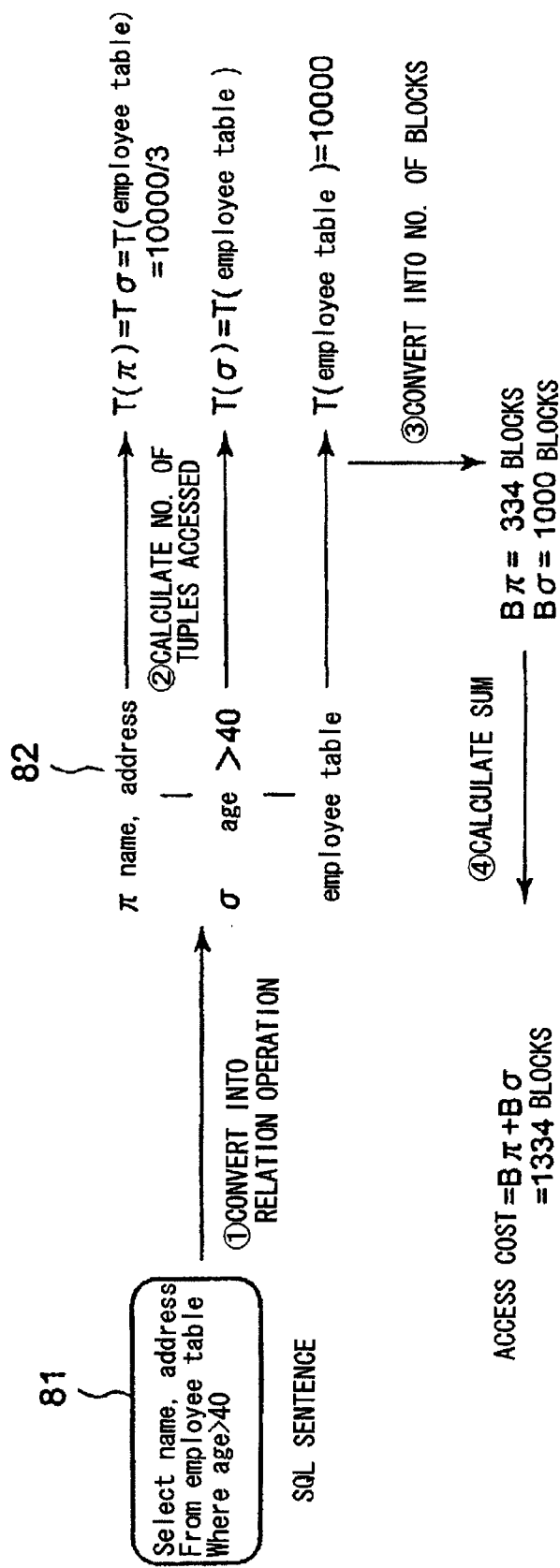
FIG. 8 is an explanatory diagram illustrating a computation example of an access cost of a SQL sentence.
Figure 9:
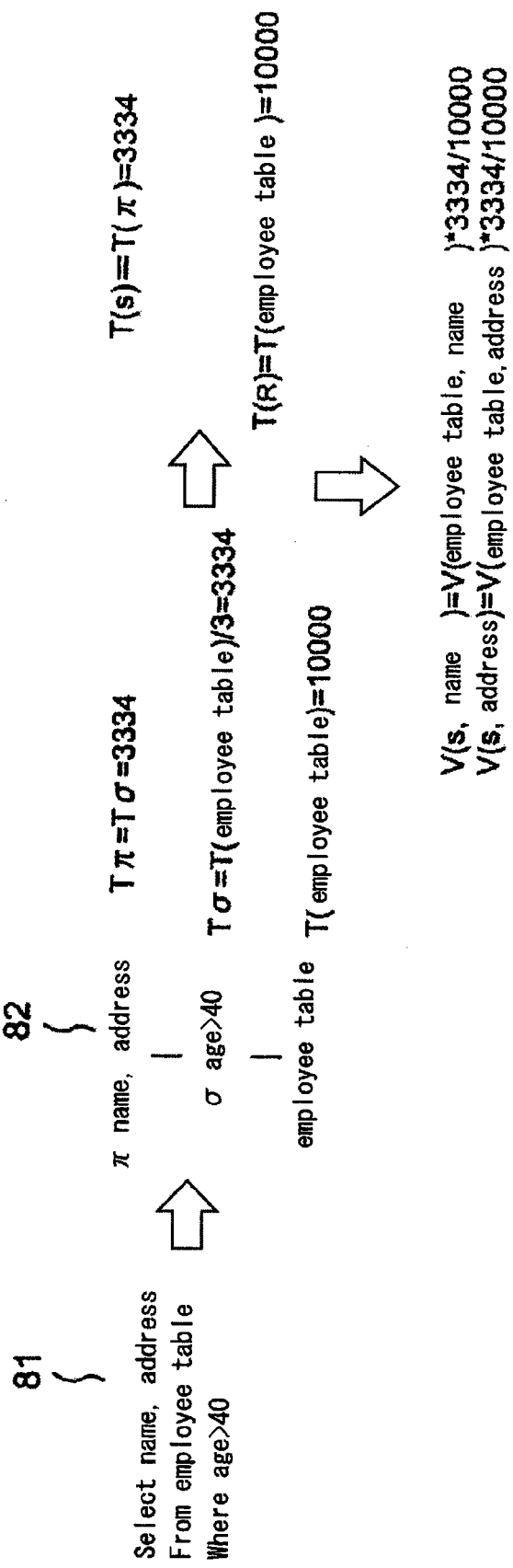
FIG. 9 is an explanatory diagram illustrating a computation example of virtual V(s, a)
Figure 10:
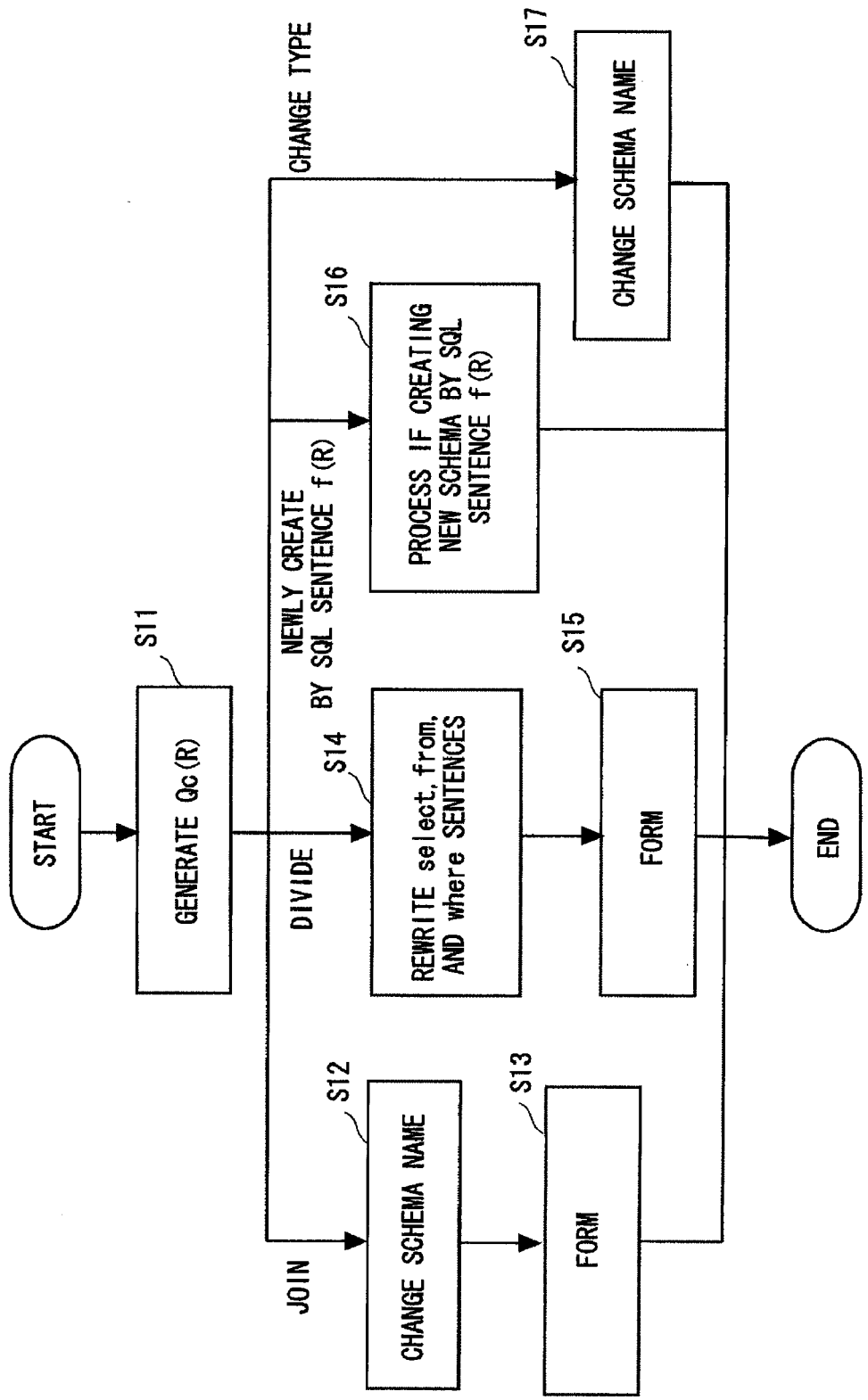
FIG. 10 is a flowchart illustrating an operation to generate a virtual access log.
Figure 11:
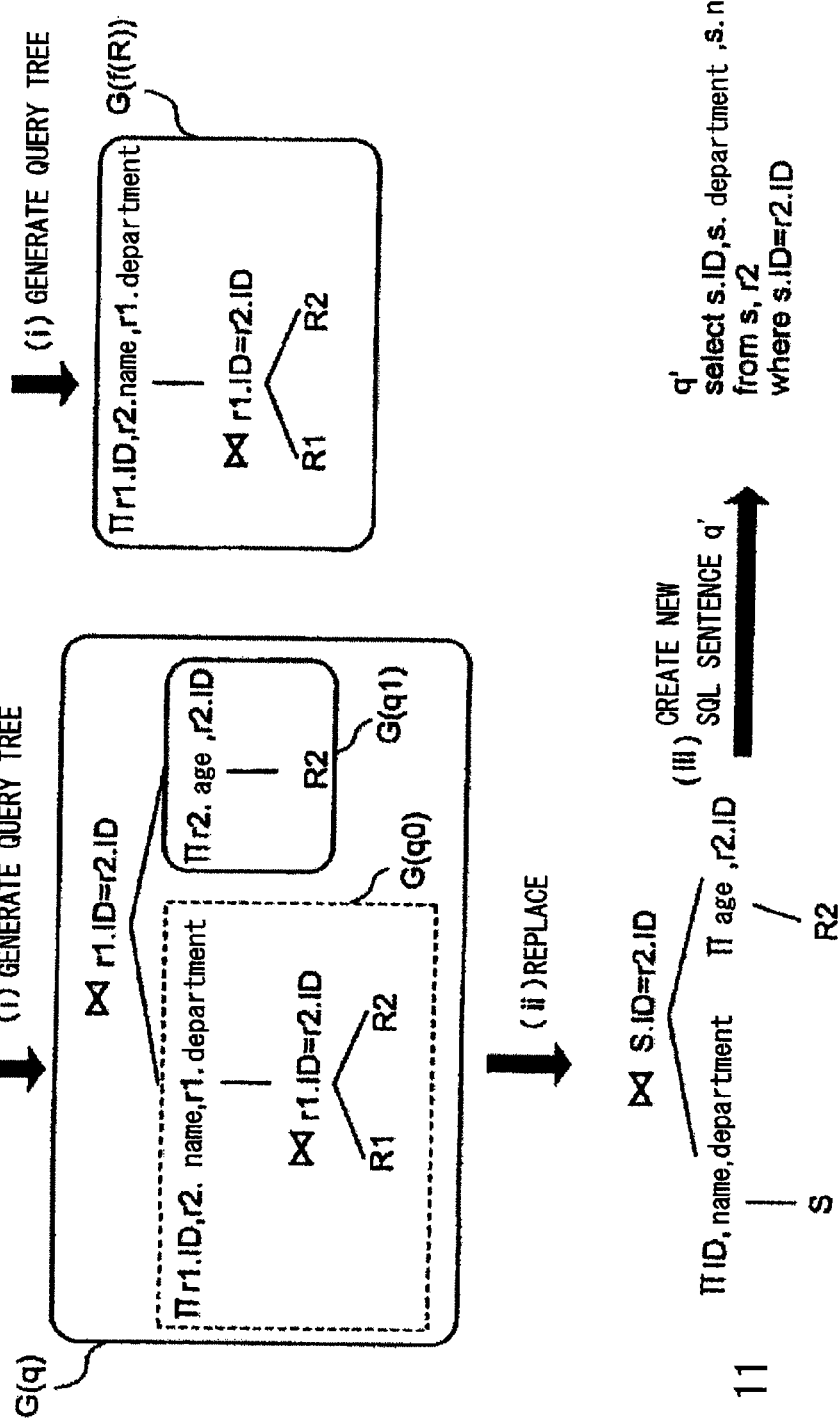
FIG. 11 is an explanatory diagram illustrating a specific example of a process to generate a query q' if a new schema s is a table defined by a SQL sentence f(R)
Figure 12:
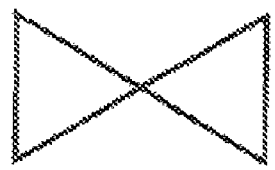
FIG. 12 illustrates a sign representing a join.
Figure 13:
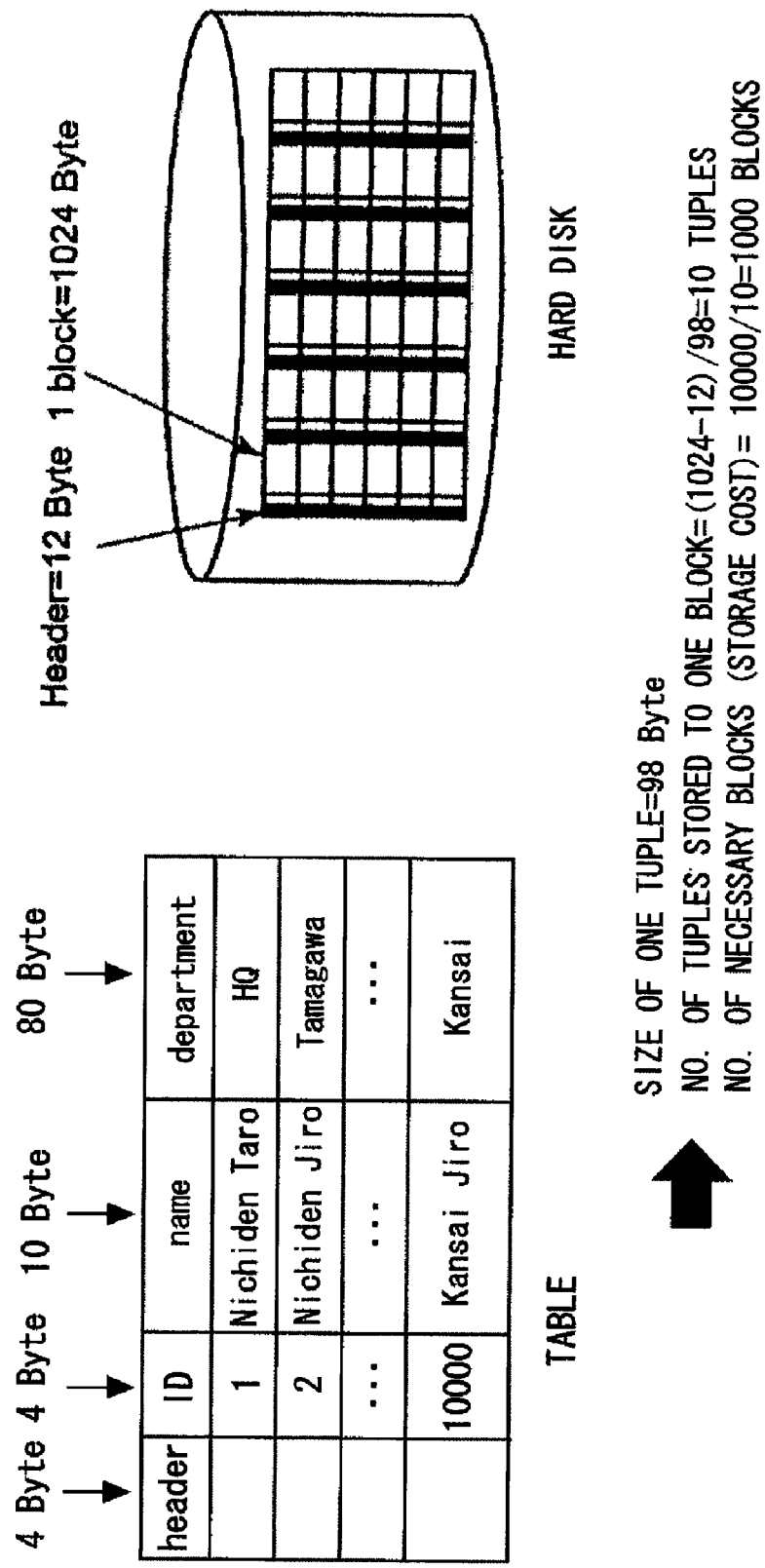
FIG. 13 is an explanatory diagram illustrating a computation example of a storage cost.
Figures 14, 15:
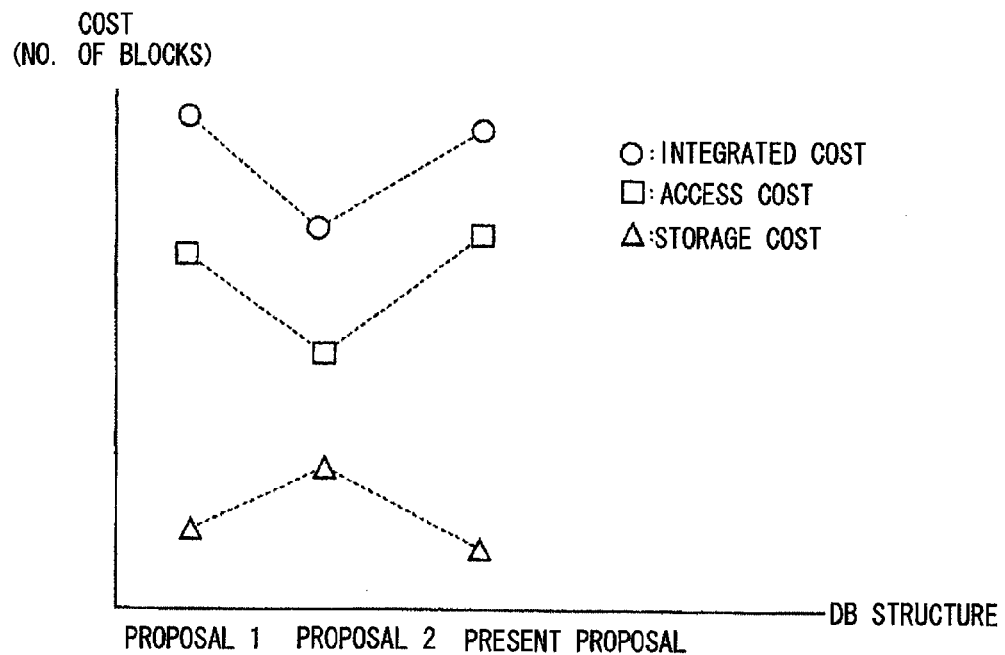
FIG. 14 is an explanatory diagram illustrating an example of a SQL sentence for defining a new table.
FIG. 15 is an explanatory diagram illustrating an example of a graph depicting an integrated cost, an access cost, and a storage cost of a database for each structure of the database.
Figure 16:
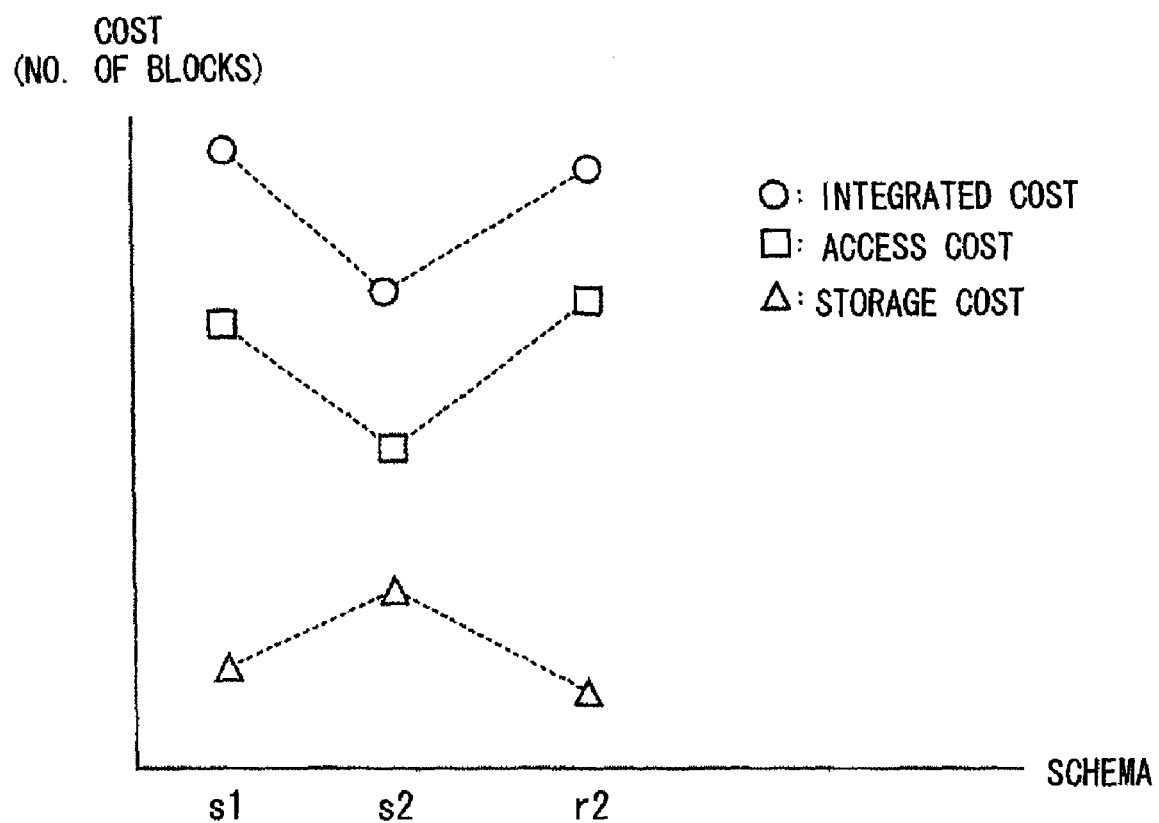
FIG. 16 is an explanatory diagram illustrating an example of a graph depicting an integrated cost, an access cost, and a storage cost of multiple types of schemata.
Figure 17:
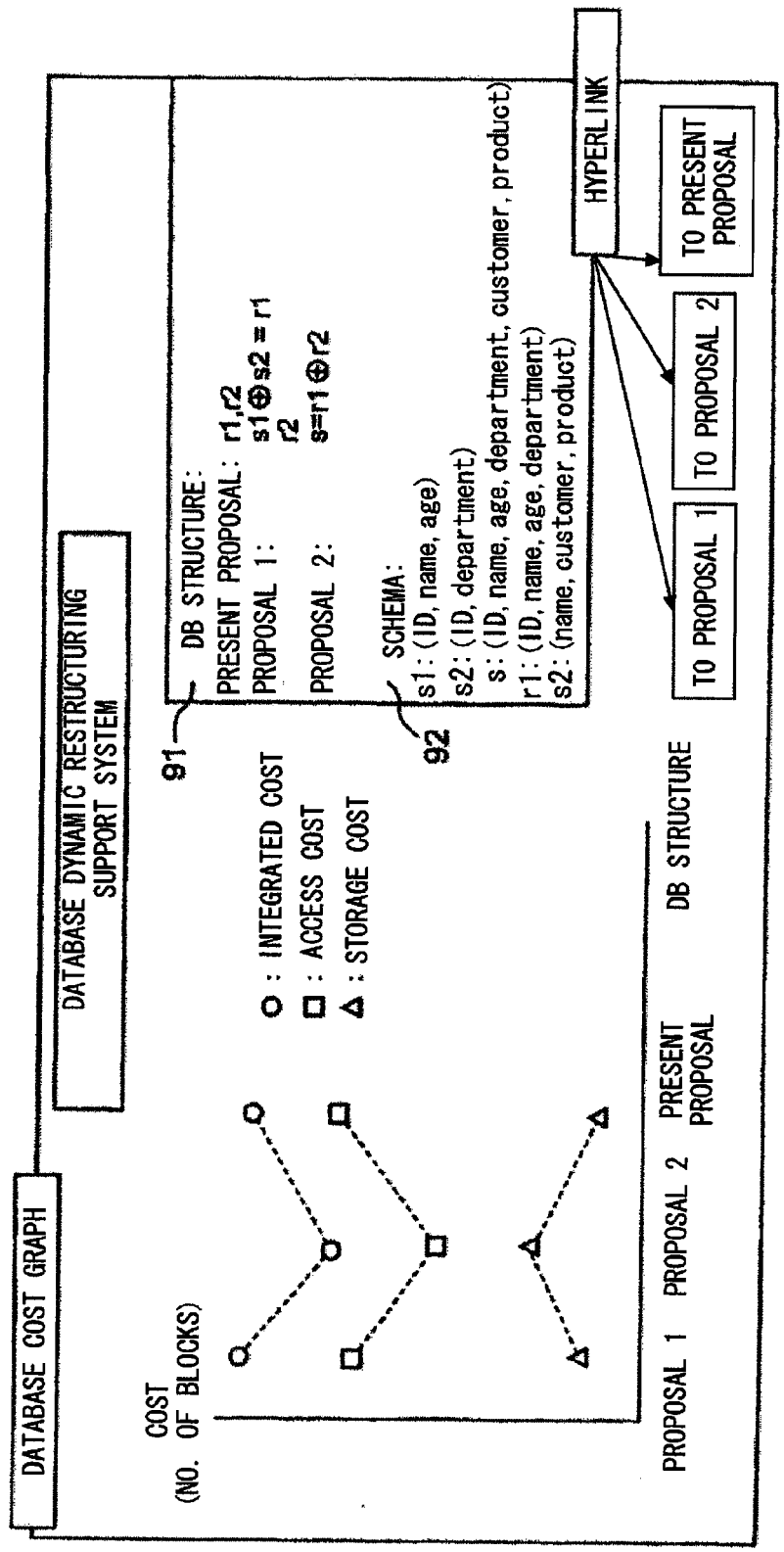
FIG. 17 is an explanatory diagram illustrating an example of a Web page which displays a database cost graph.
Figure 18:
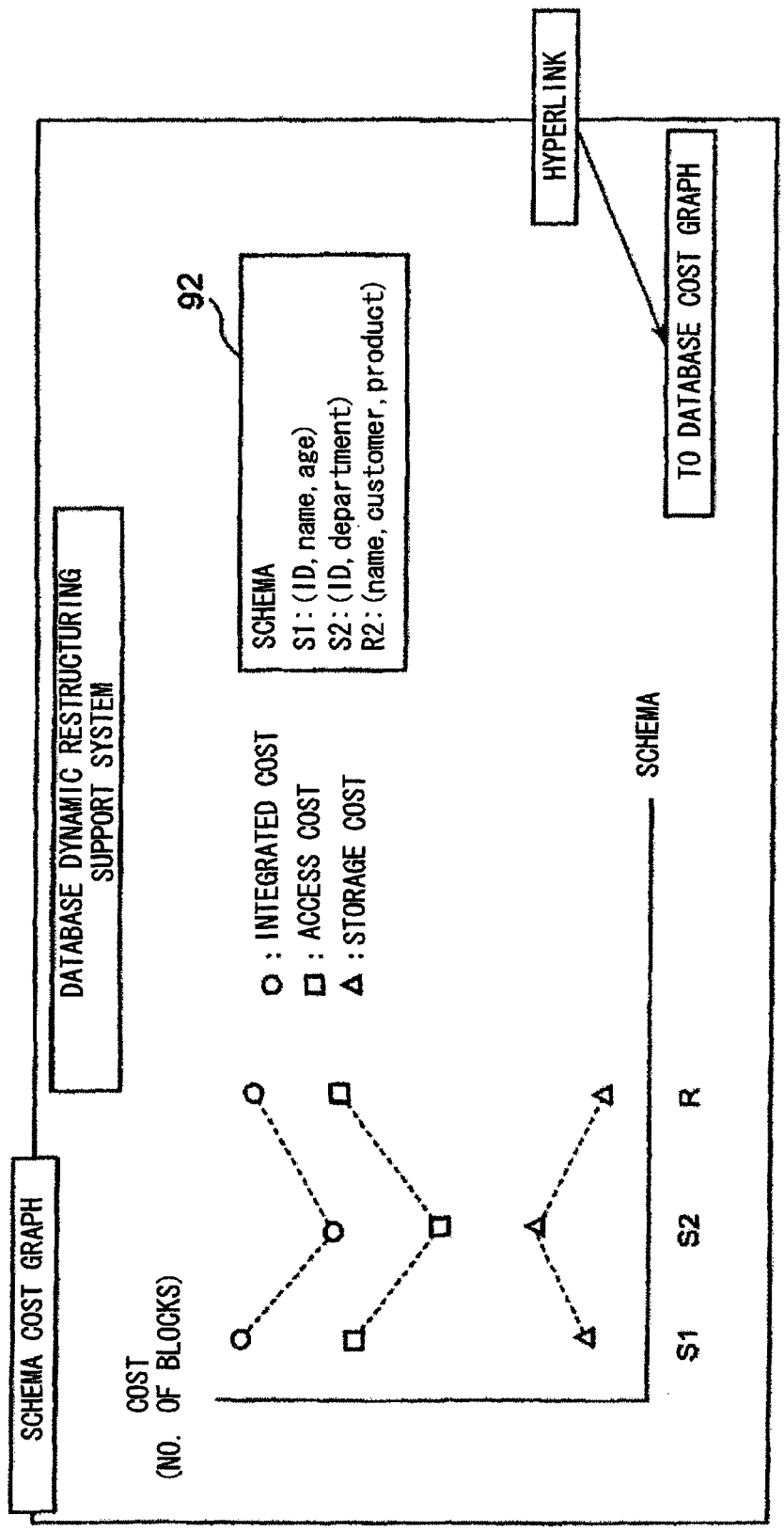
FIG. 18 is an explanatory diagram illustrating an example of a Web page which displays a schema cost graph.
Figure 19:
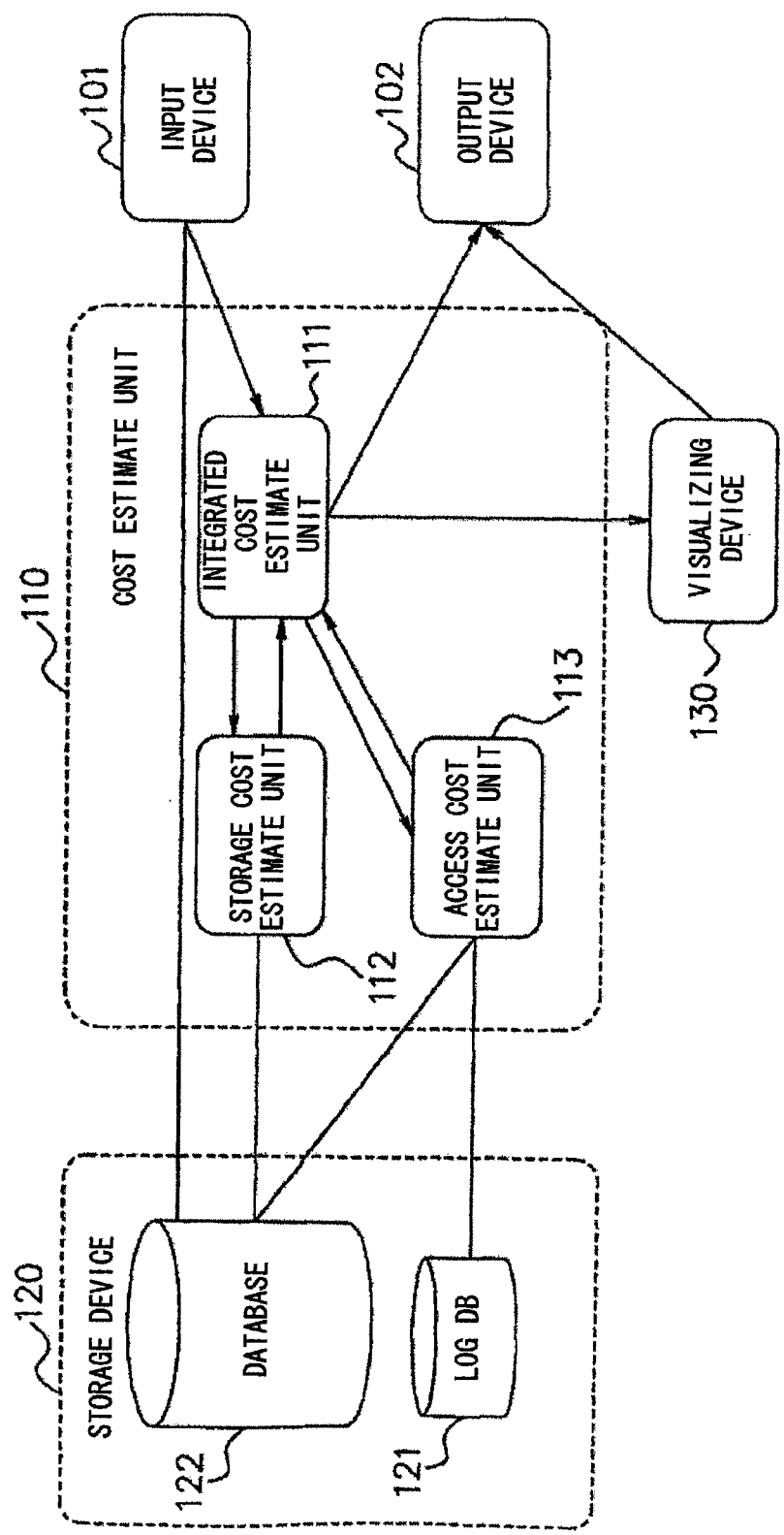
FIG. 19 is a block diagram illustrating a second exemplary embodiment of the present invention.

101 Input Device
102 Output Device
110 Support Processing Device
111 Integrated Cost Estimate Unit
112 Storage Cost Estimate Unit
113 Access Cost Estimate Unit
114 Visualizing Unit
120 Storage Device
121 Log DB
122 Database
130 Visualizing Device

The invention claimed is:

1. A database restructuring support system that calculates an evaluation value in the case of changing a structure of a database by using a storage cost and an access cost, the storage cost indicating a capacity of a storage device necessary to store data and the access cost indicating a capacity of the storage device accessed by a relation operation, the database restructuring support system comprising:

a computing processor;

a database storage unit that stores a database, the database being a set of schemata which are tables or views;

a log storage unit that stores an access log of the database;

a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header;

an input unit that inputs information to specify an existing schema inside the database stored to the database storage unit, a definition of a new schema generated from the existing schema, and information to specify an existing schema remaining after a restructure;

an existing schema storage cost calculation unit that sets a storage cost of a view to 0, and calculates a storage cost of an existing table by calculating a number of tuples of a table that are stored to one block by using the catalog information and dividing a number of tuples of the existing table by the number of tuples that are stored to one block;

an existing database storage cost calculation unit that calculates a storage cost of the database before a restructure by obtaining a sum of the storage cost of each view and each table, the storage cost of each view and each table being calculated by the existing schema storage cost calculation unit;

a new schema storage cost calculation unit, wherein the new schema storage cost calculation unit sets a storage cost of a new schema to 0 when the new schema is a view, and calculates a storage cost of a new schema when the new schema is a table by calculating a number of tuples of the new schema, calculating a number of tuples that are stored to one block by using the catalog information, and dividing the number of tuples of the new schema by the number of tuples that are stored to one block;

a new database storage cost calculation unit that calculates the storage cost of the database after the restructure by obtaining a sum of the storage cost of the new schema and the storage cost of the existing schema remaining after the restructure;

an existing schema access cost calculation unit that calculates an access cost of the existing schema by calculating a number of tuples accessed by a relation operation for each Structured Query Language (SQL) sentence representing a relation operation in an access log of a schema to calculate the access cost therefor, converting the number of tuples for each relation operation into a number of blocks by using the catalog information, calculating an access cost for each SQL sentence by obtaining a sum of each block, and obtaining a sum of the access cost of the each SQL sentence;

an existing database access cost calculation unit that calculates an access cost of the database before the restructure by obtaining the sum of the access cost calculated for the each SQL sentence in the access log calculated by the existing schema access cost calculation unit;

a new schema access cost calculation unit that calculates an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks by using the calculated number of types of the value of the attribute, the number of tuples of the new schema, and the catalog information, and calculates a sum of the access cost for the each SQL sentence;

a new database access cost calculation unit that calculates the access cost of the database after the restructure by calculating a sum of an access cost for each SQL sentence in an access log of an existing schema not used to create the virtual access log and the access cost calculated by the new schema access cost calculation unit for each SQL sentence in the virtual access log; and an integrated cost estimate unit that calculates an integrated cost of the database before the restructure by integrating the access cost and the storage cost of the database before the restructure, calculates an integrated cost of the schema before the restructure by integrating the access cost and the storage cost of the schema before the restructure, calculates an integrated cost of the database after the restructure by integrating the access cost and the storage cost of the database after the restructure, and calculates an integrated cost of the schema after the restructure by integrating the access cost and the storage cost of the schema after the restructure.

2. The database restructuring support system according to claim 1, wherein a first parameter and a second parameter are input to the input unit, the first parameter being for weighting the storage cost and the second parameter being for weighting the access cost, and
the integrated cost estimate unit calculates the integrated cost as a sum of a value obtained by multiplying the storage cost by the first parameter and a value obtained by multiplying the access cost by the second parameter.

3. The database restructuring support system according to claim 1, further comprising a visualizing unit that creates an image of a graph illustrating the access cost, the storage cost, and the integrated cost.

4. The database restructuring support system according to claim 3, wherein the existing schema storage cost calculation unit, the existing database storage cost calculation unit, the new schema storage cost calculation unit, the new database storage cost calculation unit, the existing schema access cost calculation unit, the existing database access cost calculation unit, the new schema access cost calculation unit, the new database access cost calculation unit, the integrated cost estimate unit, and the visualizing unit are realized by a same device.

5. The database restructuring support system according to claim 3, wherein the existing schema storage cost calculation unit, the existing database storage cost calculation unit, the new schema storage cost calculation unit, the new database storage cost calculation unit, the existing schema access cost calculation unit, the existing database access cost calculation unit, the new schema access cost calculation unit, the new database access cost calculation unit, and the integrated cost estimate unit are realized by a same device, and
the visualizing unit is separately provided from the device.

6. The database restructuring support system according to claim 4, wherein the visualizing unit
creates an image of a graph illustrating the access costs, the storage costs, and the integrated costs of a plurality of types of the schemata, and
creates a document to display a screen including the image and schema structure information that indicates an attribute of the schema.

7. The database restructuring support system according to claim 6, wherein the visualizing unit
creates an image of a graph illustrating the access cost, the storage costs, and the integrated costs of a plurality of types of databases, and
creates a document to display a screen including the image, database structure information indicating a schema included in each database, and schema structure information indicating an attribute of the schema.

8. The database restructuring support system according to claim 7, wherein the visualizing unit
creates a document to display an image of a graph illustrating the access costs, the storage costs, and the integrated costs of the plurality of types of the schemata,
creates a document to display an image of a graph illustrating the access costs, the storage costs, and the integrated costs of the plurality of types of the databases, and
sets a hyperlink to another document in each document.

9. A method of supporting a restructure of a database applied to a database restructuring support system that calculates an evaluation value in the case of changing a structure of a database by using a storage cost and an access cost, the storage cost indicating a capacity of a storage device necessary to store data and the access cost indicating a capacity of the storage device accessed by a relation operation, the database restructuring support system comprising a database storage unit that stores a database, the database being a set of schemata which are tables or views; a log storage unit that stores an access log of the database; a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header; and an input unit that inputs information to specify an existing schema inside the database stored to the database storage unit, a definition of a new schema generated from the existing schema, and information to specify an existing schema remaining after a restructure, the method comprising:

setting a storage cost of a view to 0, and calculating a storage cost of an existing table by calculating a number of tuples of a table that are stored to one block by using the catalog information and dividing a number of tuples of the existing table by the number of tuples that are stored to one block by an existing schema storage cost calculation unit;

calculating, by a computing processor, a storage cost of the database before a restructure by obtaining a sum of the storage cost of each view and each table, the storage cost of each view and each table being calculated by the existing schema storage cost calculation unit by an existing database storage cost calculation unit;

setting a storage cost of a new schema to 0 when the new schema is a view, and calculating a storage cost of a new schema when the new schema is a table by calculating a number of tuples of the new schema, calculating a number of tuples that are stored to one block by using the catalog information, and dividing the number of tuples of the new schema by the number of tuples that are stored to one block by a new schema storage cost calculation unit;

calculating the storage cost of the database after the restructure by obtaining a sum of the storage cost of the new schema and the storage cost of the existing schema remaining after the restructure by a new database storage cost calculation unit;

calculating an access cost of the existing schema by calculating a number of tuples accessed by a relation operation for each Structured Query Language (SQL) sentence representing a relation operation in an access log of a schema to calculate the access cost therefor, converting the number of tuples for each relation operation into a number of blocks by using the catalog information, calculating an access cost for each SQL sentence by obtaining a sum of each block, and obtaining a sum of the access cost of the each SQL sentence by an existing schema access cost calculation unit;

calculating an access cost of the database before the restructure by obtaining the sum of the access cost calculated for the each SQL sentence in the access log calculated by the existing schema access cost calculation unit by an existing database access cost calculation unit;

calculating an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks by using the calculated number of types of the value of the attribute, the number of tuples of the new schema, and the catalog information, and calculating a sum of the access cost for the each SQL sentence by a new schema access cost calculation unit;

calculating the access cost of the database after the restructure by calculating a sum of an access cost for each SQL sentence in an access log of an existing schema not used to create the virtual access log and the access cost calculated by the new schema access cost calculation unit for each SQL sentence in the virtual access log by a new database access cost calculation unit; and calculating an integrated cost of the database before the restructure by integrating the access cost and the storage cost of the database before the restructure, calculating an integrated cost of the schema before the restructure by integrating the access cost and the storage cost of the schema before the restructure, calculating an integrated cost of the database after the restructure by integrating the access cost and the storage cost of the database after the restructure, and calculating an integrated cost of the schema after the restructure by integrating the access cost and the storage cost of the schema after the restructure by an integrated cost estimate unit.

10. A non-transitory computer readable storage medium storing a database restructuring support program mounted to a computer that calculates an evaluation value in the case of changing a structure of a database by using a storage cost and an access cost, the storage cost indicating a capacity of a storage device necessary to store data and the access cost indicating a capacity of the storage device accessed by a relation operation, the computer comprising a database storage unit that stores a database, the database being a set of schemata which are tables or views; a log storage unit that stores an access log of the database; a catalog information storage unit that stores catalog information including a number of tuples of a table, a header size of the tuple, an attribute set of the table, a size of each attribute belonging to the attribute set of the table, a number of types of a value of each attribute belonging to the attribute set of the table, a block size of a management area of the database, and a size of a block header; and an input unit that inputs information to specify an existing schema inside the database stored to the database storage unit, a definition of a new schema generated from the existing schema, and information to specify an existing schema remaining after a restructure, the database restructuring support program causing the computer to execute:

an existing schema storage cost calculation process that sets a storage cost of a view to 0, and calculates a storage cost of an existing table by calculating a number of tuples of a table that are stored to one block by using the catalog information and dividing a number of tuples of the existing table by the number of tuples that are stored to one block;

an existing database storage cost calculation process that calculates a storage cost of the database before a restructure by obtaining a sum of the storage cost of each view and each table, the storage cost of each view and each table being calculated by the existing schema storage cost calculation process;

a new schema storage cost calculation process that sets a storage cost of a new schema to 0 when the new schema is a view, and calculates a storage cost of a new schema when the new schema is a table by calculating a number of tuples of the new schema, calculating a number of tuples that are stored to one block by using the catalog information, and dividing the number of tuples of the new schema by the number of tuples that are stored to one block;

a new database storage cost calculation process that calculates the storage cost of the database after the restructure by obtaining a sum of the storage cost of the new schema and the storage cost of the existing schema remaining after the restructure;

an existing schema access cost calculation process that calculates an access cost of the existing schema by calculating a number of tuples accessed by a relation operation for each Structured Query Language (SQL) sentence representing a relation operation in an access log of a schema to calculate the access cost therefor, converting the number of tuples for each relation operation into a number of blocks by using the catalog information, calculating an access cost for each SQL sentence by obtaining a sum of each block, and obtaining a sum of the access cost of the each SQL sentence;

an existing database access cost calculation process that calculates an access cost of the database before the restructure by obtaining the sum of the access cost calculated for the each SQL sentence in the access log calculated by the existing schema access cost calculation process;

a new schema access cost calculation process that calculates an access cost of the new schema by creating a virtual access log considered as an access log of the new schema from an access log of an existing schema in which the new schema is generated from, calculating a number of types of a value of each attribute belonging to an attribute set of the new schema, calculating a number of tuples accessed by a relation operation for each SQL sentence representing the relation operation in the virtual access log, converting the number of tuples for the each relation operation into a number of blocks by using the calculated number of types of the value of the attribute, the number of tuples of the new schema, and the catalog information, and calculates a sum of the access cost for the each SQL sentence;

a new database access cost calculation process that calculates the access cost of the database after the restructure by calculating a sum of an access cost for each SQL sentence in an access log of an existing schema not used to create the virtual access log and the access cost calculated by the new schema access cost calculation process for each SQL sentence in the virtual access log; and an integrated cost estimate process that calculates an integrated cost of the database before the restructure by integrating the access cost and the storage cost of the database before the restructure, calculates an integrated cost of the schema before the restructure by integrating the access cost and the storage cost of the schema before the restructure, calculates an integrated cost of the database after the restructure by integrating the access cost and the storage cost of the database after the restructure, and calculates an integrated cost of the schema after the restructure by integrating the access cost and the storage cost of the schema after the restructure.

* * * * *